United States Patent
Brighton et al.

(10) Patent No.: US 11,492,136 B2
(45) Date of Patent: Nov. 8, 2022

(54) AIRCRAFT UPLOCK

(71) Applicant: AIRBUS OPERATIONS LIMITED, Bristol (GB)

(72) Inventors: Trevor Brighton, Bristol (GB); Matthew Gadd, Bristol (GB); Robert Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 299 days.

(21) Appl. No.: 16/604,704

(22) PCT Filed: Apr. 12, 2018

(86) PCT No.: PCT/EP2018/059401
§ 371 (c)(1),
(2) Date: Oct. 11, 2019

(87) PCT Pub. No.: WO2018/189299
PCT Pub. Date: Oct. 18, 2018

(65) Prior Publication Data
US 2020/0377224 A1    Dec. 3, 2020

(30) Foreign Application Priority Data

Apr. 13, 2017    (GB) ..................... 1705945

(51) Int. Cl.
*B64D 45/00*      (2006.01)
*B64C 3/56*       (2006.01)
(Continued)

(52) U.S. Cl.
CPC ............ *B64D 45/0005* (2013.01); *B64C 3/56* (2013.01); *B64C 23/072* (2017.05); *B64C 25/28* (2013.01); *B64D 2045/001* (2013.01)

(58) Field of Classification Search
CPC .................... B64D 45/0005; B64D 2045/001; B64C 3/56; B64C 23/072; B64C 25/28; Y02T 50/10
See application file for complete search history.

(56) References Cited

U.S. PATENT DOCUMENTS 2,567,114 A    9/1951    Linn
8,061,654 B2 *  11/2011  Meyer ..................... B64C 25/26
                                                    244/102 A
(Continued)

FOREIGN PATENT DOCUMENTS

EP    0265197    4/1988
EP    1314839    5/2003
(Continued)

OTHER PUBLICATIONS

International Search Report and Written Opinion of the ISA for PCT/EP2018/059401 dated Jul. 3, 2018, 11 pages.
(Continued)

*Primary Examiner* — Valentina Xavier
(74) *Attorney, Agent, or Firm* — Nixon & Vanderhye P.C.

(57) ABSTRACT

An uplock is disclosed including a hook configured to engage a capture pin mounted on an aircraft component. The hook is mounted for movement between a closed position and an open position. The uplock further includes an indicator system configured to detect whether a pin is engaged with the hook when the hook is in the closed position.

19 Claims, 22 Drawing Sheets

(51) Int. Cl.
*B64C 23/06* (2006.01)
*B64C 25/28* (2006.01)

(56) References Cited

U.S. PATENT DOCUMENTS

| | | | |
|---|---|---|---|
| 2006/0163426 A1* | 7/2006 | Smith III | B64C 25/26 244/102 R |
| 2017/0038225 A1 | 2/2017 | Carbone et al. | |
| 2020/0269973 A1* | 8/2020 | McCambridge | H04L 67/12 |
| 2021/0394891 A1* | 12/2021 | Wells | B64C 25/28 |

FOREIGN PATENT DOCUMENTS

| | | |
|---|---|---|
| EP | 2730499 | 5/2014 |
| EP | 2730500 | 5/2014 |
| EP | 3 000 723 | 3/2016 |
| EP | 3 093 231 | 11/2016 |
| GB | 1183003 | 3/1970 |
| GB | 2161202 | 1/1986 |
| GB | 2386152 | 10/2003 |
| GB | 2 460 088 | 11/2009 |
| GB | 2530578 | 3/2016 |
| GB | 2538320 | 11/2016 |
| GB | 2550410 | 11/2017 |
| SU | 1766026 | 3/1996 |
| WO | 2005/005252 | 1/2005 |
| WO | 2009/088961 | 7/2009 |

OTHER PUBLICATIONS

Combined Search and Examination Report for United Kingdom Application No. GB1705945.2, nine pages, dated Oct. 6, 2017.
Search Report for United Kingdom Application No. GB1705945.2, four pages, dated Jan. 24, 2018.
Excerpt from Comet Maintenance Manual of Fig. 10.5 and Fig. 10.7, 2 pages, Nov. 1972.

* cited by examiner though it is intended that the scope of protection afforded
AIRCRAFT UPLOCK

CROSS RELATED APPLICATIONS

This application is the U.S. national phase of International Application No. PCT/EP2018/059401 filed Apr. 12, 2018, which claims priority to United Kingdom (GB) Patent Application 1705945.2 filed Apr. 13, 2017, the entire contents of each of which are hereby incorporated by reference.

BACKGROUND OF THE INVENTION

The present invention concerns an uplock for an aircraft component. More particularly, but not exclusively, this invention concerns an uplock comprising a hook configured to receive a capture pin mounted on the aircraft component to be restrained. Thus, the invention concerns an uplock that holds an aircraft component in position by capturing a capture pin mounted on that component with a hook. The invention also concerns an uplock suitable for use with a retractable landing gear or a folding wing tip device.

Typically, aircraft with retractable landing gear have an uplock which holds the gear in place in the landing gear bay when the landing gear has been retracted. FIGS. 1 (a) and (b) show a schematic drawing of a typical uplock 1 in the (a) open and (b) locked configuration. The uplock comprises a hook 2 mounted to pivot about a point labelled A in FIG. 1. The hook 2 includes a cam surface 4 at the upper end of the hook 2 and an arm 6 extending out either side of the hook 2. The uplock 1 also comprises a locking lever 8 mounted to pivot about a point labelled B in FIG. 1. A first end of the lever 8 includes a roller 10 which rests on the cam surface 4 of the hook 2 when the uplock is in the open configuration of FIG. 1(a). At the other end of the lever 8 there is a sensor target 12. In the open configuration of FIG. 1(a) the sensor target 12 is spaced apart from a proximity sensor 14 mounted on a main body 22 of the uplock 1. The proximity sensor 14 provides a signal to avionics system 46 shown schematically by a dashed line in FIG. 1. An arm 16 extends from the underside of the lever 8. A spring 18 extends between the hook 2 and the locking lever 8. A hydraulic actuator 20 is positioned adjacent to the locking lever 8. The hook 2, locking lever 8, sensor 14 and actuator 20 are mounted to the main body 22. In FIG. 1(a) a capture pin 26 mounted on the leg of a landing gear (not shown) is spaced apart from the hook 2, beneath the right-hand side hook arm 6.

In the locked configuration of FIG. 1(b) the capture pin 26 is engaged with the hook 2 which is rotated anti-clockwise from its position in FIG. 1(a) to a closed position. The locking lever 8 is rotated clockwise from its position in FIG. 1(a); the roller 10 of the locking lever 8 is located within a recess 28 in the cam surface 4 of the hook 2 and the sensor target 12 on the lock lever 8 is adjacent to the sensor 14.

In use, when the landing gear is extended the uplock 1 is in the open configuration of FIG. 1(a), with the hook 2 in the open position and the roller 10 of the locking lever 8 resting on the cam surface 4 of the hook 2. The capture pin 26 is spaced apart from the hook 2 and free to move relative to the uplock 1. As the landing gear retracts the landing gear pin 26 contacts the underside of hook arm 6 pushing it upwards and causing the hook 2 to rotate anti-clockwise about pivot point A. As the hook 2 rotates the cam surface 4 moves relative to the locking lever 8, this relative movement is accommodated by the roller 10 which rolls along the cam surface 4. The roller 10 on the locking lever 8 rolls along the cam surface 4 until it reaches the locking recess 28. As the roller 10 drops into the locking recess 28 the locking lever 8 pivots clockwise about point B, which moves the portion of the locking lever 8 on which the sensor target 12 is mounted towards the sensor 14. As the hook 2 is rotating towards the closed position the tension spring 18 extends. At the end of this process, the uplock is in the locked configuration of FIG. 1(b) with the target 12 on the locking lever 8 located next to the sensor 14, the hook 2 in the closed position, and the locking lever 8 engaged with the locking recess 28. The capture pin 26 is retained by the hook 2 to prevent movement of the landing gear on which it is mounted. With the target 12 near the sensor 14, the sensor provides a 'locked' signal to the aircraft avionics system 46. The presence of the locking lever 8 in the recess 28 prevents the hook 2 rotating away from the closed position.

To release the landing gear the actuator 20 is engaged and contacts the locking lever 8 at the locking arm 16 causing the locking lever 8 to rotate anti-clockwise and disengaging the locking lever 8 from the locking recess 28. With the locking lever 8 disengaged, the tension spring 18 acts, along with the weight of the landing gear via the pin 26 on the hook 2 to rotate the hook 2 clockwise towards the open position and the pin 26 can move downwards.

In uplocks in accordance with the prior art a 'locked' signal has been taken to indicate that the landing gear (or other component) is both 'locked' and in the fully retracted ('up') position. However, the Applicant has now identified that if there is a structural failure in certain regions of the hook 2, for example the bottom portion of the hook, the pin 26 would be released but the locking lever 8 would remain in the locked position. This gives rise to the potential for a hidden failure mode in which the sensor continues to indicate that the gear is locked when the gear has dropped and is resting on the doors of the landing gear bay. It would be advantageous to provide an uplock in which this type of failure was detected.

It has recently been proposed to use folding wing tip devices in order to allow the span of the aircraft to be varied during use. For example, folding wing tip devices have been introduced into passenger aircraft, where a wing tip device is moveable between a flight configuration for use during flight, and a ground configuration for use during ground-based operations. In the ground configuration the wing tip device is moved away from the flight configuration such that the span of the aircraft wing is reduced, thereby allowing use of existing airport gates and taxiways while providing an increased span in flight. It would be advantageous to provide an uplock mechanism that reliably maintains the wingtip device in a given configuration. It would be advantageous to provide an uplock mechanism that minimises the movement of a wing tip device (or other aircraft component) when the device is being retained by the uplock.

The present invention seeks to mitigate one or more of the above-mentioned problems. Alternatively or additionally, the present invention seeks to provide an improved uplock for use with an aircraft component.

SUMMARY OF THE INVENTION

The present invention provides, according to a first aspect, an uplock for use with an aircraft component, for example a landing gear assembly or wing-tip device, the uplock comprising a hook configured to engage a capture pin mounted on the aircraft component, the hook being mounted for movement between a closed position and an open position. The uplock may be configured to provide an indication of whether a capture pin is engaged in the hook when the hook is in the closed position. Providing an indicator system configured to detect whether a pin is engaged with the hook may allow the detection of a previously hidden failure mode in which the hook (or the remnants thereof) remains in the closed position, but fails structurally such that the capture pin is released. The uplock may comprise an indicator system configured to detect (i) that the hook is locked in the closed position and (ii) that a pin is present in the hook.

The uplock may comprise a hook configured to engage (i.e. receive) the capture pin. The hook may be mounted for movement between an open position in which the hook does not constrain the movement of the pin relative to uplock and a closed position in which the hook constrains the movement of the pin.

The uplock may comprise an indicator member. The indicator member may form part of an indication system. The indicator member may be mounted for movement between a first position and a second position. The uplock may be configured such that a capture pin engaged in the hook maintains the indicator in the first position and the indicator member moves from the first position towards the second position when the pin is no longer engaged in the hook. That is to say, the uplock may be configured such that the presence of a capture pin in the hook is required to keep the indicator member in the first position. The uplock may be configured such that, in normal use, the indicator member can only occupy the first position when a capture pin is engaged with the hook. It may be that, in use, if the hook is in the closed position and a pin is engaged with the hook the indicator member takes the first position, but if the hook is in the closed position and the pin is not engaged with the hook the indicator member takes the second position. The position of the indicator member may be used to determine whether the pin is in the hook and thereby facilitate the detection of failure modes in which the hook remains in the closed position but the pin is no longer engaged with the hook.

Thus, in one aspect of the invention there may be provided an uplock for use with a landing gear or a wing tip device, the uplock comprising a hook configured to engage a capture pin mounted on said landing gear or wing tip device, the hook being mounted for movement between a closed position and an open position; an indicator member mounted for movement between a first position and a second position; and a sensor configured to detect the position of the indicator member, the uplock being configured such that, when the hook is in the closed position a capture pin engaged in the hook maintains the indicator member in the first position, and such that the indicator member moves away from the first position in the case when the hook remains in the closed position but the pin is no longer engaged in the hook. The uplock may be configured such that the indicator moves from the first position to the second position when the pin is no longer engaged in the hook.

In some applications it may be desirable to have the indicator member mounted to a region of the hook, for example adjacent the tip of the hook, such that a structural failure that caused the pin to be released would also result in the indicator member becoming detached from the remainder of the hook. Thus, in such applications the indicator member may move away from the first position when it becomes detached, but not necessarily towards the second position.

The uplock may be configured such that a capture pin engaged in the hook, for example resting in the hook, exerts a force on the indicator member. The uplock may be configured such the capture pin contacts, for example directly contacts, the indicator member when the pin is engaged in the hook. The indicator member may be located adjacent the hook such that the capture pin contacts the indicator member when received in the hook.

The indicator member may be biased towards the second position such that, in normal use, the indicator member remains in the second position in the absence of the force exerted on the indicator member by a capture pin engaged in the hook. The uplock may be configured such that, in use, the force exerted on the indicator member by a pin engaged in the hook is sufficient to overcome the bias and move the indicator to the first position (and maintain it there). The uplock (for example the indicator system) may comprise a biasing means, for example a spring or other resilient element, configured to maintain the indicator member in the second position. Thus, in the absence of a force from the pin being exerted on the indicator member the indicator member moves to and/or is maintained in the second position. It will be appreciated that it is not essential to have a biasing means; the uplock may be configured such that the indicator member is lifted by a pin engaged in the hook, and drops back down, for example under the action of gravity, if the pin is no longer present in the hook.

The uplock may comprise a sensor configured to detect the position of the indicator member. The sensor may form part of an indicator system. The sensor may be a proximity sensor or other form of sensor. The uplock may comprise a sensor target detectable by the proximity sensor. The target may be connected to the indicator member such that movement of the indicator member results in movement of the target. The target may be mounted on the indicator member or may be connected to the indicator member via a series of linking members (discussed in more detail below). The indicator member may include a target for a proximity sensor. The uplock may be configured such that, in normal use, the target associated with (for example connected to) the indicator member is only adjacent the proximity sensor when the indicator member is in the first (pin present) position. Thus, in use, a signal from the proximity sensor that a sensor target associated with the indicator member is 'near' may be taken as an indication that the pin is engaged in the hook. Any other signal from the proximity sensor, i.e. that the sensor target is 'far' may be taken as an indication that the pin is not engaged in the hook.

The indicator member may be mounted for rotational movement. The indicator member may be mounted on the main body of the uplock. The indicator member may be mounted on the hook. In the case that the indicator member is mounted to the hook certain failure modes of the hook may result in the indicator member becoming disconnected from the remainder of the uplock.

Additionally or alternatively, the indicator system may comprise the hook being biased towards the closed position such that the hook is prevented from moving to the open position when unlocked unless the pin is engaged with the hook such that the weight of the pin can overcome the bias. Thus, in another aspect of the invention, there may be provided an uplock for an aircraft component, the uplock comprising: a hook mounted for movement between a closed position and an open position, the hook being configured to receive a capture pin mounted on the aircraft component; a lock configured to lock the hook in the closed position; and wherein the hook is biased to remain in the closed position when the lock is disengaged and the uplock is configured such that the force exerted on the hook by a capture pin received therein is sufficient to overcome the bias and cause the hook to move from the closed position towards the open position. In normal use, it may be that the bias is overcome by the weight of the pin on the hook such that the hook can open. In the case that the pin is not engaged with the hook when the hook is unlocked, the hook will remain in the closed position but as the pin is not engaged with the hook the aircraft component can move to its new position. That the hook has remained closed while the aircraft component has moved to its new position may be used as an indication that there is a fault with the hook and accordingly this arrangement may facilitate the detection of the previously hidden failure mode.

The uplock may be configured to provide a signal to an aircraft avionics system (discussed below) to indicate that the hook is in the closed position. The aircraft avionics system may be configured to receive a signal that the aircraft component is in the second position. The avionics system may be configured to provide an alert to the pilot of a possible uplock fault in the case that the signals indicate that (i) the hook is in the closed position and (ii) the aircraft component is in the second position.

The uplock may include a biasing mechanism arranged to bias the hook to the closed position. The biasing mechanism may be configured such that, once the hook has moved away from the closed position beyond a predetermined point (for example displaced by a given distance or rotated by a given angle) the biasing mechanism acts to return the hook to the open position. The hook may be mounted for movement, for example rotation, between the open and closed positions. The biasing mechanism may act to move the hook towards the closed position when the hook is in a first range of positions, for example when the hook is within 5 degrees of rotation from the closed position. The biasing mechanism may act to move the hook towards the open position when the hook is in a second range of positions, for example when the hook is more than 5 degrees of rotation from the closed position.

The biasing mechanism may exert a force on the hook at a first point. The hook may be mounted for rotation about a mounting point. When the hook is in the closed position, the first point may be located on one side of the mounting point such that the force exerted by the biasing mechanism on the hook causes the hook to rotate in a first direction. When the hook has moved beyond a predetermined point, the first point may be located on the other side of the mounting point such that the force exerted by the biasing mechanism on the hook causes the hook to rotate in a second, opposite, direction.

The biasing mechanism may comprise a first biasing element (or set of elements), for example a spring or set of springs, which act to maintain the hook in the closed position, and a second biasing element (or set of elements), for example a spring or set of springs, which act to move the hook to the open position. The uplock may be arranged such that when the hook is in the closed position the force exerted on the hook by the first element(s) (e.g. a first spring) is greater than the force exerted on the hook by the second element(s) (e.g. a second spring). The first element(s) may act to move the hook in a first direction and/or to resist movement in a second opposite direction. The second element(s) may act to move the hook in the second direction. The first and second element(s) may be balanced such that the force exerted by a pin engaged in the hook will overcome the bias towards the closed position. For example, the difference in the force exerted on the hook by the first spring and the second spring may be less than the force exerted on the hook by a pin received therein.

The uplock may be arranged such that when the hook has been moved away from the closed position by a predetermined amount (e.g. distance or angle), the force exerted on the hook by the second element(s), e.g. the second spring, is greater than the force exerted on the hook by the first element(s), e.g. the first spring. Thus, once an initial movement away from the closed position has been completed the hook may return to the open position without the need for the force from the pin.

Additionally or alternatively, the hook may be mounted to provide a greater degree of resistance to movement in a first direction (for example away from the closed position and/or towards the open position) than to movement in a second, different, direction (for example towards the closed position and/or away from the open position). The uplock may comprise a friction generator which increases the resistance of the hook to movement in the first direction. The friction generator may provide more friction when the hook is rotating away from the closed position then when the hook is rotating towards the closed position.

Alternatively, the hook may not be biased as discussed above. The uplock may be arranged such that the hook is biased to return to the open position when the lock, e.g. the lock member, is released. The uplock may comprise one or more biasing elements configured to return the hook to the open position when the lock member is released (i.e. moved to the unlocked position).

Additionally or alternatively, the indicator system may comprise a load detector configured to measure the load on the hook and/or transmitted to the aircraft from the hook via the remainder of the uplock. The load detector may comprise a sensor arranged to measure the load at one or more points along a load path between the hook and the aircraft. The load detector may comprise a load cell. The load cell may be configured to generate an electrical output that depends on, for example varying with, the detected force. The load may be measured by the load cell by detecting strain. The load cell may comprise a strain gauge. The load cell may comprise a piezoelectric sensor. The load cell may comprise a fiber Bragg grating. Thus, in one aspect of the invention the uplock may comprise a strain gauge configured to measure the strain in a portion of the uplock. In use, when the capture pin is engaged in the hook, a load from the aircraft component may be transferred to the aircraft structure on which the uplock is mounted via the capture pin, the hook, the main body (if present), the casing (if present) and the at least one mounting point (if present). Thus the uplock may comprise a load path via which load from a capture pin engaged in the hook is transferred to the aircraft structure on which the uplock is mounted. The load detector, for example the strain gauge may be configured to measure the load, for example by measuring the strain, at one or more points along the load path. For a given configuration there may be more than one load path that can be identified along which stress and/or strain can be measured when the uplock hook is loaded. The strain gauge may be mounted on the hook to measure the level of strain in the hook. The load detector, for example the strain gauge, may be mounted on the main body or casing to measure the load thereof. The load detector, for example the strain gauge, may be mounted to the capture pin, or any portion of the aircraft component (or any other aircraft structure which reacts loads from the uplock—e.g. the loads generated when the pin is engaged with the hook when the hook is in its closed position) that experiences different loads when the capture pin is engaged in the hook when the hook is in the closed position, compared to when the capture pin is not engaged with the hook when the hook is in the closed position. The load detector, for example the strain gauge, may be configured to provide a signal corresponding to the measured load (or strain) to the avionics system. The avionics system may be configured to interpret the measurement exceeding a predetermined threshold value, as indicating that a capture pin is engaged in the hook. The predetermined threshold may be between 10 and 100 kN, for example between 30 and 50 kN. In the case that the measurement does not exceed the predetermined threshold the avionics system may be configured to provide an alert to the pilot of a possible uplock fault. It may be that the load detector is configured to provide an output confirming whether or not the load and/or strain detected is indicative of a fault (it may not be necessary for the load detector to provide a signal that provides a precise measurement of the actual strain or stress detected in certain embodiments).

Thus, in another aspect of the invention, there may be provided an uplock for an aircraft component, the uplock comprising a hook configured to engage a capture pin mounted on the aircraft component; at least one mounting point for mounting the uplock to an aircraft; and a load detector (e.g. a strain gauge) located on a load path between the hook and a location on the aircraft (the load path for example including the at least one mounting point). For example, the strain gauge may be located on a load path between the hook and the at least one mounting point). Providing an uplock including a strain gauge on the load path between the hook and the aircraft may facilitate detection of a hook failure (or other failure modes leading to the release of the pin from the hook).

A load path may be defined as a route by which load is transferred from one point in a structure to another. The load path of the uplock may comprise a portion of the hook, the main body, casing (if present) and/or a mounting point (if present). The sensor of the load detector, for example a strain gauge, may be mounted on the hook, the main body, the casing or the at least one mounting point to measure the strain therein. The load detector (or strain gauge) may be configured to provide a signal to the avionics system. In some embodiments, a load detector may be configured to measure the load in the aircraft structure to which the uplock is mounted. Thus, it will be appreciated that it is not necessary for the load detector to be in the uplock. It may be that the load detector could be mounted on the aircraft at a location on the opposite side of the mounting point (if present) to the uplock.

Additionally or alternatively, the indicator system may comprise a sensor wire and a circuit for measuring the resistance in said wire. Thus, in another aspect of the invention there may be provided an uplock for an aircraft component, the uplock comprising a hook configured to engage a capture pin mounted on the aircraft component; a sensor wire; and a circuit for measuring the resistance of said sensor wire, and wherein the sensor wire extends across at least a portion of the hook, such that failure of said portion of the hook will cause mechanical damage to said sensor wire and thereby alter the resistance of said wire. Such a system may allow for the detection of previously hidden faults by providing an indication of whether the hook is damaged (which may impact on the ability of the hook to retain the pin). The uplock may be configured to provide a supply of power to said sensor wire and circuit, for example on a continuous basis. It may be that the sensor wire extends across at least a portion of the hook, for example around a portion of the perimeter of the hook, for example around the lower portion of the hook. The sensor wire may be received in a groove formed in the surface of the hook, such that in normal use the wire is protected from damage by said groove. The uplock may be configured such that deformation and/or breaking of the wire changes the resistance measured by the circuit. Thus, mechanical damage to the hook may lead to an alteration in the resistance of said wire. The uplock may be configured to provide a signal corresponding to the measure of said resistance from the circuit to the avionics system (discussed below). The avionics system may be configured to provide an alert to the pilot of a possible uplock fault if the measured resistance changes by more than a predetermined amount over a predetermined period of time. It will be appreciated that the resistance of a circuit may vary slightly over long periods of time, but the present method comprises determining whether a change in the resistance that is indicative of mechanical damage to the sensor wire has occurred. Such a change may comprise a change (for example an increase or decrease) in resistance of more than 10%, for example by more than 20% for example by more than 50%. Such a change may occur over a period of time of less than 10 seconds, for example less than 5 seconds, for example less than 1 second. The change may comprise a drop in resistance indicating a short circuit (e.g. a reduction in resistance to zero or near zero). The change may comprise an increase indicating an open circuit (e.g. an increase to very high, for example infinite resistance).

The sensor wire may comprise a first conductor and a second conductor. The sensor wire may be configured such that in normal use the first and second conductors are insulated from each other, but mechanical deformation of the sensor causes the first and second conductors to be brought into electrical contact thereby changing the resistance of at least one of the conductors. The first and second conductors may be spaced apart when the wire is undamaged. The circuit may be configured to measure the resistance of a circuit including one of the first or second conductors. Alternatively or additionally, the sensor wire may comprise a single conductor.

The uplock may comprise a lock configured to lock the hook in the closed position. The lock may comprise a lock member configured to engage, e.g. interlock with, with one or more other elements of the uplock to mechanically prevent the hook from moving from the closed position. The uplock may be configured such that the lock member prevents the hook opening (i.e. moving from the closed position) when the lock member is in a locked position. The uplock may be configured such that, in normal use, the lock member can only occupy the locked position when engaged with another element, for example a hook or cam connected to the hook, such that the hook is prevented from opening. The uplock may be configured such that, in normal use, the lock member can only occupy the locked position when the hook is in the closed position. Thus, in the case that the uplock comprises a sensor configured to detect the position of the lock member, the position of the lock member may be used to determine whether the hook is in the closed position. The lock member may be mounted for movement between a locked position in which it prevents movement of the hook and an unlocked position in which movement of the hook is possible. The lock member, for example a lock lever, may be configured to engage a cam surface associated with the hook when the hook is in the closed position to prevent movement of the hook from the closed position. The cam surface may form part of the hook, or part of a separate cam connected to the hook. The lock member may be mounted for movement between a locked position in which the member is engaged with the cam surface and an unlocked position in which the member is disengaged from the cam surface. The lock member may comprise an actuator arranged to move the lock member from the locked position towards the unlocked position. Thus, the actuator may release the lock member. The uplock may be configured such that, in normal use, the lock member does not move away from the locked position unless released by the actuator.

The uplock may be configured such that the lock member returns to the locked position when the locking actuator is released and the hook is in the locked position. The uplock may be configured such that, in normal use, the lock member cannot return to the locked position if the hook is in the open position. The uplock may be configured such that the cam surface prevents the lock member returning to the locked position if the hook is in the open position.

The uplock may comprise a sensor configured to detect the position of the lock member. The sensor may be a proximity sensor or another type of sensor. The uplock may comprise a target suitable for detection by the proximity sensor. The target may be connected to the lock member such that movement of the lock member results in movement of the target. The target may be mounted on the lock member or may be connected to the lock member via a series of linking members (discussed in more detail below). The lock member may include the target for the proximity sensor. The uplock may be configured such that, in normal use, the target associated with the lock member is only adjacent the proximity sensor when the lock member is in the locked position.

The uplock may comprise a cam surface associated with the hook. The uplock may be configured such that the position of the cam surface relative to the lock member depends on the position of the hook. The cam surface may be part of the hook. Thus, the hook may comprise a cam surface. The cam surface may be provided as a separate body to the hook. Thus, the uplock may comprise a cam having a cam surface. The cam surface may include a locking recess in which a portion of the lock member is received when the lock member is engaged with the hook in the closed position. The cam surface may be connected to the hook such that when the lock member is engaged in the lock recess, movement of the hook is prevented (i.e. when the lock member is in the locked position). It will be appreciated that the lock recess may take a wide range of forms, provided that the shape of the cam surface at the recess prevents the cam surface moving relative to the locking lever in a way that would lead to movement of the hook away from the closed position.

The uplock may comprise a recess (a pin recess) configured to receive the capture pin. The recess may be formed in the main body of the uplock. The recess may be defined by the casing of the uplock. The recess may comprise an opening via which, in use, the pin enters the recess. The hook may extend across at least a portion of the opening when the hook is in the closed position. The hook may extend across a smaller portion (or none) of the opening when the hook is in the open position.

The uplock may comprise a casing. The hook, lock member (if present), indicator member (if present), and/or proximity sensors (if present) may be mounted at least partially within the casing. The casing may comprise one or more mounting points for mounting the uplock to an aircraft structure, for example a portion of the airframe. Thus, the uplock may comprise at least one mounting point for mounting the uplock to the aircraft.

The aircraft component may be mounted on an aircraft. The aircraft component may comprise a capture pin. The aircraft component may be mounted for movement between a first position and a second, different, position. The uplock may be configured to retain the aircraft component in the first position, which may be referred to hereafter as the held position. The uplock may be configured such that the hook is engaged with the pin when the aircraft component (and therefore the capture pin) is in the held position. The uplock may be configured such that movement of the aircraft component and thereby the capture pin towards the held position causes the hook to move from the open position to the closed position. The uplock may be configured such that movement of the hook from the open position to the closed position causes the lock to move from the unlocked to the locked position. The hook may limit movement of the capture pin and thereby the aircraft component when the hook is in the closed position and the lock is locked. The hook may limit movement of the capture pin away from the held position. The uplock may be configured such that as the pin moves towards the held position the pin contacts the hook causing the hook to rotate from the open position to the closed position. The hook may comprise a protrusion, wherein contact of the protrusion by the pin causes the hook to rotate. The uplock may be configured such that when the lock member is disengaged the movement of the pin away from the held position causes the hook to move from the closed position to the open position. It will be appreciated that when the capture pin is engaged (or retained) in the hook and the hook is locked in the closed position the hook constrains the movement of the capture pin and thereby the aircraft component to which the capture pin is attached.

The aircraft component on which the capture pin is mounted may be a retractable landing gear assembly. The capture pin may be mounted on the main strut of the landing gear assembly. Thus the uplock may be configured for use with a retractable landing gear assembly. The landing gear assembly may be mounted to the aircraft for movement between an extended configuration and a retracted configuration. In use, the uplock may be mounted on the aircraft to restrain the landing gear assembly in the retracted or 'up' configuration. Thus the held position may be a retracted position. The uplock may be configured such that in normal use the hook prevents extension of the landing gear assembly when the hook is locked in the closed position. Retractable landing gear are well known in the art and will not be described further here. The landing gear may be a main landing gear or nose landing gear. The landing gear may be mounted on the fuselage or a wing of the aircraft.

The aircraft component on which the capture pin is mounted may be a wing tip device. Thus the uplock may be configured for use with a wing tip device, for example a folding wing tip device. The uplock may be configured such that in normal use the hook prevents movement of the wing tip device from the flight configuration to the ground configuration under the action of the loads experienced during flight. The wing tip device may be a wing tip extension, for example a planar tip extension. In other embodiments, the wing tip device may comprise, or consist of, a non-planar device such as a winglet. In the flight configuration the trailing edge of the wing tip device is preferably a continuation of the trailing edge of a fixed wing. There is preferably a smooth transition from the fixed wing to the wing tip device. It will be appreciated that the may be a smooth transition, even where there are changes in sweep or twist at the junction between the fixed wing and wing tip device. However, there are preferably no discontinuities at the junction between the fixed wing and wing tip device. The upper and/or the lower surfaces of the wing tip device may be a continuation of the upper and lower surface of the fixed wing.

It will be appreciated that there are other aircraft components which must be secured during flight, and for which confirmation that locking has been achieved is desirable. This may include but is not limited to landing gear bay doors, cargo bay doors, flaps, engine covers and/or cargo ramps.

The aircraft to which the uplock is mounted may comprise an avionics system. The uplock may be configured to provide signals from one or more sensors to the avionics system. The signal(s) may correspond to the position of one or more of the hook, the indicator member (if present), the lock member (if present) and/or the cam (if present). The aircraft component may be configured to provide signals from one or more sensors to the avionics system, for example to indicate the state of the component, for example whether the component is extended or retracted, or in the flight or ground configurations.

The avionics system may be configured to provide information to the pilot regarding the condition of the uplock and/or the aircraft component. The avionics system may be configured to provide an alert to the pilot when it is determined that there may be a fault with the uplock. The avionics system may be configured to determine whether there is a fault in the uplock in dependence on the position of one or more of the lock member, the hook, the indicator member and/or the condition of the indicator system. The avionics system may be configured to determine whether the hook is in the closed position in dependence on the position of the lock member. The sensor associated with the lock member may be configured to provide a signal to the avionics system to indicate whether the lock member is in the locked position. The sensor associated with the indicator member may be configured to provide a signal to the avionics system to indicate whether the indicator member is in the first position. The strain gauge, load detector, or other load detection means may be configured to provide a signal to the avionics system corresponding to the load experienced by the hook. The resistance measuring circuit may be configured to provide a signal to the avionics system corresponding to the resistance of the wire. In the case that the avionics system receives one or more signals indicating the lock member is in the locked position and the indicator member is not in the first position the avionics system may alert the pilot that there is a possible fault with the uplock.

It may be that for an uplock to be 'safe' three criteria must be met; (i) the hook must be closed, (ii) the hook must be locked in the closed position and (iii) the capture pin must be received in the hook. The avionics system may be configured to only provide a safe signal when all three criteria are met. The uplock may be configured to provide separate signals corresponding to each of these criteria to the avionics system. That is to say, a closed/open signal, a locked/unlocked signal and a pin up/pin down signal. The avionics system may be configured to determine whether the uplock is safe/not-safe in dependence on the signals so received. Alternatively, the uplock may be configured to provide a single signal to the avionics system; a safe/not-safe signal. The uplock may be configured such that the safe signal is only provided when all three criteria are met, and otherwise a not-safe signal is provided. The uplock may be configured to provide an alert to the pilot when the uplock is not-safe.

A sensor target or sensor may be associated with (i.e. connected to) more than one of the elements described above. A target may be associated with one or more of the hook, the cam (if present), the lock member (if present), the indicator member (if present) or other elements of the uplock. In the case that a target is associated with more than one element, the uplock may be configured such that said target is only adjacent (i.e. near) the sensor when each of those elements is in the up or locked (as appropriate) position. The uplock may be arranged such that a target is only located adjacent the proximity sensor when one or more of the following criteria are satisfied: the lock is engaged (where the target is associated with the lock), the hook is in the closed position (where the target is associated with the hook, cam and/or the lock), and/or the indicator member is in the first position (where the target is associated with the linking member). The uplock may be arranged such that the target on the sensor member is only located adjacent the proximity sensor when all of those criteria are fulfilled. Using the linking members in this way may allow a single sensor, or a reduced number of sensors to detect the condition of the uplock.

The uplock may comprise a sensor member upon which a sensor target is located. The uplock may comprise one or more linking members connecting the sensor member to one or more of the hook, the cam (if present), the lock member (if present), the indicator member (if present) or other elements of the uplock. The linking members may comprise rigid links and/or compressible links, for example springs. Where the presence of a target adjacent a sensor denotes that more than one criteria has been fulfilled, the linking members may be configured such that for each of said criteria fulfilled the sensor moves closer to the target.

In another aspect of the invention there is provided a method of detecting a fault in an uplock for an aircraft component, the uplock comprising a hook configured to engage a capture pin mounted on the aircraft component; the method comprising the step of determining whether a fault has occurred in dependence on whether a capture pin is engaged in the hook when the hook is in a closed position, and, in the case that the pin is not engaged in the hook, providing an alert to the pilot of a possible uplock fault. Determining whether a pin is present in the hook when the hook is in the closed position may facilitate the identification of failure modes that were not detectable in prior art uplocks.

The step of determining whether a pin is present in the hook may comprise using the indicator member described above. Thus, in another aspect of the invention there may be provided a method of detecting a fault in an uplock for an aircraft component, the method comprising the step of determining whether a fault has occurred in dependence on the position of an indicator member as described above. There may be provided a method of detecting a fault in an uplock for a landing gear or a wing tip device, the uplock comprising a hook configured to engage a capture pin mounted on said landing gear or wing tip device; and an indicator member, the method comprising the steps of: moving the hook to a closed position in which a capture pin engaged in the hook holds (or would hold if present) the indicator member in a first position; allowing the indicator member to move to a second, different, position if the capture pin is no longer engaged in the hook (i.e. the indicator moves to the second position if the capture pin becomes disengaged from the hook or is never engaged in the hook); and determining whether a fault has occurred in dependence on the position of the indicator member.

The method may comprise determining that a pin is engaged in the hook if the indicator member is in the first position. The method may comprise determining that a pin is not engaged in the hook if the indicator member is in the second position or any other position that is not the first position. The method may comprise providing an alert to the pilot if the indicator member is not in the first position when the hook is locked in the closed position. The method may comprise providing a signal to the avionics system corresponding to the position of the indicator member. The method may comprise using a signal from a proximity sensor to determine the position of the indicator member.

The capture pin may hold the indicator member in an elevated position when the pin is engaged in the hook. When the pin is brought into engagement with the hook the pin may lift the indicator member from the second position to the first position. The indicator member may drop from the first position to the second position when the pin is disengaged from the hook.

The capture pin may press the indicator member into the first position when the pin is engaged in the hook. When the pin is brought into engagement with the hook the pin may force the indicator member into the first position in opposition to the action of a biasing means. The biasing means may return the indicator member to the second position when the pin is disengaged from the hook. The method may comprise allowing the pin to move to the second position if the pin is disengaged from the hook.

Additionally or alternatively, the step of determining whether a pin is present in the hook may comprise using a hook biased towards the closed position as discussed above. Thus, in another aspect of the invention, there may be provided a method of detecting a fault in an uplock, the uplock comprising: a hook moveable between a closed position and an open position and a biasing mechanism that acts to maintain the hook in the closed position, said biasing mechanism being configured such that the force exerted by a capture pin received in the hook is sufficient to overcome the bias and cause the hook to move from the closed position towards the open position, the method comprising the steps of: locking the hook in the closed position to maintain the aircraft component in a first position; unlocking the hook and moving the aircraft component to a second, different, position; and determining whether a fault has occurred in dependence on the position of the hook and the position of the aircraft component.

The method may comprise providing a signal to the avionics system indicating the position of the hook and/or the lock member as discussed above. The method may comprise providing a signal to the avionics system indicating the position of the aircraft component. The method may further comprise providing an alert to the pilot if the hook is in the closed position and the aircraft component is in the second position.

The method may comprise allowing the hook to move to the open position under the action of the biasing mechanism and the force exerted on the hook by a pin received therein. The method may comprise allowing the hook to remain in the closed position under the action of the biasing mechanism if there is no pin received in the hook to exert a force thereon.

Additionally or alternatively, the step of determining whether a pin is present in the hook may comprise using a load detector as described above. Thus, in another aspect of the invention, there may be provided a method of detecting a fault in an uplock for an aircraft component, the uplock comprising a hook configured to engage a capture pin mounted on the aircraft component, the method comprising the step of measuring (directly or indirectly) the load experienced by the uplock. For example the load may be measured by measuring the strain experienced by one or more regions of the uplock. The load may be measured by measuring the strain experienced by one or more regions of the aircraft that sustain load when the uplock is loaded. The method may comprise determining whether a capture pin is engaged in the hook in dependence on the load so measured (for example by measuring the strain). The method may comprise determining whether a capture pin is engaged in the hook in dependence on whether the load so measured exceeds a predetermined threshold value. In the case that the load exceeds the threshold value, the method may comprise determining that a capture pin is engaged in the hook. In the case that the load does not exceed the threshold value, the method may comprise determining that a capture pin is not engaged in the hook. An aircraft avionics system may be configured to make such a determination. For example, there may be a step of the aircraft avionics system determining whether a capture pin is engaged in the hook in dependence on whether the load so measured exceeds a predetermined threshold value (for example, deeming that the capture pin is engaged in the hook, in the event that the load exceeds a threshold value) and/or a step of determining whether a capture pin is not engaged in the hook in dependence on whether the load so measured is below a predetermined threshold value—which may (or may not) be the same threshold value—for example, deeming that the capture pin is not engaged in the hook, in the event that the load is below that threshold value. The method may further comprise providing an indication to the pilot as to whether a capture pin is engaged in the hook and/or providing an indication to the pilot as to whether a capture pin is not engaged in the hook. The step of measuring the load directly may comprise using a measurement device, for example a strain gauge, mounted within the uplock to measure the load. The step of measuring the load indirectly may comprise using a measurement device, for example a strain gauge, mounted on the structure of the aircraft to which the uplock is mounted to measure the load transferred from the uplock to the aircraft.

Additionally or alternatively, the step of determining whether a pin is present in the hook may comprise determining whether the hook is damaged using a sensor wire as described above. Thus, in another aspect of the invention, there is provided a method of detecting a fault in an uplock for an aircraft component, the uplock comprising a hook configured to engage a capture pin mounted on the aircraft component; and a sensor wire mounted on the hook, and the method comprises the steps of: repeatedly measuring the resistance of the sensor wire, and determining whether the hook has been damaged in dependence on the variation of the measured resistance.

The method may comprise providing a signal to the avionics system corresponding to the resistance of the wire. The method may comprise providing an alert to the pilot that the hook may have been damaged if the resistance of the wire changes significantly.

The method may comprise providing a signal to the avionics system to indicate whether the hook is locked in the closed position, e.g. 'locked' or 'unlocked'. The lock signal may comprise a signal that a target associated with the lock member is near to a proximity sensor, the unlocked signal may comprise a signal that a target associated with the lock member is far from a proximity sensor (or vice versa). The uplock may be configured such that the 'locked' signal is only provided when the lock member has engaged the hook when the hook is in the closed position. The uplock may be configured such that at all other times an 'unlocked' signal is provided. It may be that the uplock is configured such that the lock can only engage the hook when the hook is in the closed position, in which case a signal indicating the lock or lock member is in the locked position may also indicate that the hook is in the closed position. Alternatively, a first signal indicating the position of the lock member and a second signal indicating the position of the hook member may be provided to the avionics system. The method may comprise providing a signal to the avionics system indicating whether a pin is engaged in the hook, e.g. 'pin up' (held) or 'pin down'. The pin up signal may comprise a signal that a target associated with the indicator member is near to a proximity sensor and/or the pin down signal may comprise a signal that a target associated with the indicator member is far from a proximity sensor (or vice versa). The uplock may be configured such that the 'pin up' signal is only provided when a pin is engaged in the hook when the hook is in the closed position. The uplock may be configured such that at all other times a 'pin down' signal is provided. The method may comprise providing an alert to the pilot if the signals indicate that the hook is locked but the pin is not engaged in the hook, e.g. 'locked' and 'pin down'. A single signal indicating that the hook is locked in the closed position and the pin is engaged in the hook may be provided to the avionics system. Alternatively, two separate signals may be provided to the avionics system; one indicating that the hook is locked in the closed position and another signal indicating that a pin is present in the hook. Alternatively, three separate signals may be provided to the avionics system; a first signal indicating that the hook is locked, a second signal indicating that the hook is in the closed position and a third signal indicating that a pin is present in the hook.

In another aspect of the invention, there is provided an uplock for an aircraft component, the uplock comprising a stop and a hook configured to receive a capture pin mounted on the aircraft, the hook and stop being mounted for movement relative to each other between a closed position and an open position, and wherein the uplock is configured such that when the hook is in the closed position a capture pin received therein is in contact with both the hook and the stop. Providing an uplock in which the capture pin is sandwiched between a hook and a stop may reduce movement of the aircraft component when the uplock is in the locked configuration. This may be of particular application when the aircraft component is a wing tip device, but it will be appreciated that it may also be advantageously used with retractable landing gear and other aircraft components.

The hook and/or stop may be mounted for movement relative to each other. The hook may be mounted such that movement of the hook between the open position and the closed position comprises a first stage in which the hook rotates between the open position and an intermediate position in which the hook captures the pin at a location where the pin is spaced apart from the stop. The hook may be mounted such that movement of the hook between the open position and the closed position comprises a second stage in which the hook moves between the intermediate position and the closed position. This two stage movement may facilitate secure capture of the pin. In the intermediate position a portion of the hook may be spaced apart from the stop. In the closed position said portion of the hook may be closer to the stop. The first stage may comprise a (predominantly or wholly) rotational movement from the open position to an intermediate position in which a pin received in the hook is spaced apart from the stop. The second stage may comprise a displacement (e.g. a translation) of the hook from the intermediate position to a closed position in which a capture pin received in the hook is in contact with both the hook and the stop. Thus, the second stage may comprise displacing the hook to bring the pin into contact with the stop. The uplock may be configured such that the pin is first received in the hook at the intermediate position. The capture pin may be compressed between the hook and the stop when the hook is in the closed position. Thus, the second stage of movement may comprise clamping the pin between the hook and the stop.

The stop may comprise a stop recess configured to receive a portion of the capture pin. Thus, when the hook is in the closed position, the pin may be received in both the hook and (at least partially) the stop recess. The stop may form part of the main body of the uplock. The stop recess may be defined by the main body and/or the casing of the uplock. The stop may form part of the main body or casing of the uplock.

The uplock may comprise a sensor, for example a pressure sensor or proximity sensor, mounted on the stop. The stop sensor may be configured to detect the presence of the pin in contact with the stop, and/or located in the stop recess (if present). The stop sensor may be configured to provide a signal to the avionics system to indicate whether a pin is in contact with the stop.

The uplock may be configured such that the contact between the pin as it moves towards its held position and the hook causes the hook to rotate from the first position to the intermediate position. The uplock may comprise an actuator configured to move the hook from the intermediate position to the closed position. Thus, moving the hook between the open and closed position may comprise a rotation caused by contact with the capture pin and a translation caused by the action of an actuator.

The hook may be mounted for eccentric movement. For example, the hook may be mounted for rotation about a first point which is itself configured to rotate about a second point. Eccentrically mounting the hook may allow for both rotational and translational movement of the hook in a mechanically simple manner. The hook may be mounted using an eccentric bush. The method may comprise allowing the hook to be rotated about the first point by the capture pin as the capture pin moves towards its held position, and then rotating the first mounting point about the second mounting point to cause the hook to bring the pin into contact with the stop. Thus, the first stage of movement may comprise a rotation of the hook about the first point. The second stage of movement may comprise a rotation of the first point around the second point. The second stage may comprise rotating the first point through 180 degrees around the second point such that at the end of the second stage the hook has been translated towards the stop.

In another aspect of the invention there is provided a method of retaining an aircraft component using an uplock comprising a stop and a hook configured to receive a capture pin mounted on the aircraft component, the method comprising the steps of: allowing the hook to rotate relative to the stop to capture the pin; and then moving the hook towards the stop until the pin is sandwiched between the hook and the stop.

The method may comprise the step of moving the aircraft component towards the held position such that the contact between the capture pin as it moves towards the held position and the hook causes the hook to rotate. Capturing the pin may comprise receiving the pin within the hooked portion of the hook.

The step of moving the hook towards the stop may comprise rotating an eccentrically mounted bush using an actuator.

In another aspect of the invention, there is provided an uplock for use with an aircraft component comprising a capture pin, the uplock comprising a hook configured to receive the capture pin and a hook recess configured to receive a portion of the hook. The hook recess and said portion of the hook may be shaped such that rotation of the hook is limited or prevented when said portion is received in the recess. The hook may be mounted for movement between the closed position and the open position, as described above. The uplock may be configured such that said portion of the hook is received in the recess when the hook is in the closed position, and said portion of the hook is not received in the recess when the hook is in the open position. Constraining a portion of the hook within a recess in this manner may increase the strength of the uplock and/or reduce movement of the aircraft component.

The hook may be mounted such that movement of the hook between the open position and the closed position comprises both a rotation and a translation relative to the hook recess. The movement of the hook between the open position and the closed position may comprise two stages. The first stage may comprise movement from the open position to an intermediate position. It may be that in the open position said portion of the hook is spaced apart from the hook recess such that the hook is free to rotate. It may be that in the intermediate position, the hook has rotated away from the open position, and said portion of the hook is spaced apart from (but may be closer to) the hook recess such that the hook is still free to rotate. The second stage may comprise a movement from the intermediate position to the closed position in which said portion of the hook is received in the hook recess such that further rotation of the hook is prevented. The uplock may be configured such that the portion of the hook moves into the hook recess during the second stage of movement. Thus, the second stage of movement may comprise inserting said portion of the hook into the recess. The hook and recess may be configured such that in the closed position the portion of the hook retained in the recess limits, for example prevents, rotation of the hook. It may be that a smaller portion, or none of the hook, is located within the recess when the hook is in the open position.

The hook may be mounted on a guide member for rotation relative to said member. The guide member may be mounted for translational movement relative to the hook recess. The guide member may be mounted in the hook recess. The hook recess may comprise a channel. The guide member may be mounted in the channel for reciprocal movement along said channel. The first stage of movement may comprise rotating the hook relative to the guide member between the open position and the intermediate position. The second stage of movement may comprise moving the guide member along the channel to move said portion of the hook into the channel. The uplock may comprise an actuator configured to move the hook relative to the recess. The actuator may be connected to the guide member to move the guide member. The actuator may be configured to move the guide member in the recess, for example back and forth along the channel. Thus, the actuator may move a portion of the hook into and/or out of the recess by moving the guide member.

The uplock may comprise a lock configured to lock the hook and/or the guide member in the closed position. As discussed above the hook may be locked in the closed position by the lock, and a sensor may provide information about the state of the lock to the avionics system.

The hook recess may be formed in the main body of the uplock. The recess may be defined by the casing of the uplock. The recess may comprise an opening via which, in use, the hook enters the recess. At least a portion of the hook may be located within the recess when the hook is in the closed position.

The uplock may comprise a sensor, for example a pressure sensor or proximity sensor, configured to detect the presence of the guide member or relevant portion of the hook in the hook recess. The hook sensor may be configured to provide a signal to the avionics system to indicate whether the portion of the hook has been received in the recess. The avionics system may be configured to provide an alert to the pilot in the case that the hook or guide member is not present in the recess when a sensor associated with the lock indicates the hook is locked in position.

In another aspect of the invention there is provided a method of retaining an aircraft component in position with an uplock, the uplock comprising a hook mounted for movement between a closed position and an open position, the hook being configured to receive a capture pin mounted on the aircraft component, the uplock further comprising a hook recess configured to receive a portion of the hook, the method comprising inserting a portion of the hook into the recess as the hook moves from the open position to the closed position, such that the recess constrains the movement of the hook.

In another aspect of the invention, there is provided an uplock for an aircraft component, the uplock comprising a hook mounted for movement between a closed position and an open position, the hook being configured to receive a capture pin mounted on the aircraft component, and a cam mounted for rotation between a first, locking, position in which the cam prevents movement of the hook from the closed position and a second, unlocked, position in which the cam allows movement of the hook from the closed position. In the second position, the cam may allow movement of the hook from the closed position towards, for example to, the open position. Thus, the lock member may comprise a rotatable cam. Using a rotatable cam may reduce the risk of a jam as compared with using a lever or other element having a substantially translational movement at the point it engages the hook. It will be appreciated that in the context of this aspect of the invention, the cam is provided in addition to the hook—i.e. such that the uplock comprises the hook and (additionally and separately) the cam (e.g. the cam forming no part of the hook).

The cam may be mounted for rotation through more than 180 degrees, for example for more than 270 degrees, for example for complete rotation through 360 degrees. The cam may be mounted for rotation in a first direction e.g. clockwise or anti-clockwise. The cam may be mounted for rotation and/or the uplock may be configured to rotate the cam in only one direction, e.g. clockwise or anti-clockwise.

The cam may be in the form of a substantially cylindrical member or disc. It will be appreciated however that the cam may have a non-circular cross section, for example the cam may be an elliptic cylinder. The hook may comprise, or be connected to a body comprising, a lock recess (discussed in more detail above) configured to receive a portion of the cam therein. In the locked position a portion of the cam may be received in the lock recess. In the locked position the cam may be in direct contact with the hook. In the unlocked position the cam may be disengaged from the lock recess. In the unlocked position the cam may be spaced apart from the hook, and/or the lock recess. It may be that there is no mechanical linkage between the locking cam and the hook.

In another aspect of the invention, there is provided an uplock for an aircraft component, the uplock comprising a cam and a hook mounted for movement between an open position and a closed position, the hook being configured to receive a capture pin mounted on the aircraft component. The method may comprise the steps of: rotating the cam in a first direction from a locked position in which the cam prevents movement of the hook to an unlocked position in which the cam allows movement of the hook. After rotating the cam to the unlocked position, the method may further comprise then rotating the cam in the first direction to return to the locked position.

There may be provided an uplock for use with an aircraft component that is not a landing gear assembly, for example for use with a wing tip device, the uplock comprising: a hook mounted for movement between a closed position and an open position, the hook being configured to engage a capture pin mounted on the wing tip device when the hook is in the closed position, and a lock configured to lock the hook in the closed position. Thus, in another aspect of the invention there may be provided a wing assembly comprising a fixed portion and a wing tip device mounted on the fixed portion for movement between a ground configuration and a flight configuration, and a capture pin mounted on the wing tip device, the wing assembly further comprising an uplock mounted on the fixed portion of the wing, the uplock comprising a hook mounted for movement between a closed position and an open position, and a lock configured to lock the hook in the closed position the wing assembly being configured such that, in use, the hook engages the capture pin when the hook is in the closed position and the wing tip device is in the flight configuration. The uplock may be configured such that the hook remains in the closed position when the lock is released unless acted upon by an actuator. The uplock may comprise a biasing mechanism which acts to maintain the hook in the closed position when the lock is disengaged and wherein the biasing mechanism is configured such that the force exerted on the hook by a capture pin received therein is not sufficient to overcome the bias and cause the hook to move from the closed position towards the open position. The uplock may comprise a sensor, for example a proximity sensor, configured to provide a single signal to the avionics systems in dependence on whether (i) the hook is in the closed position, (ii) the lock (or lock member if present) is in the locked position and (iii) a capture pin is engaged in the hook (for example the indicator member is in the first position). The uplock may be configured such that a safe signal (or a signal interpreted as 'safe' by the avionics system) is provided by the sensor only if (i), (ii) and (iii) is true. The uplock may be configured such that a not-safe signal (or a signal interpreted as 'not-safe' by the avionics system) is provided if any one of (i), (ii) and (iii) is untrue. The uplock may comprise a target, sensor member and linking members as discussed above.

In another aspect of the invention there is provided an avionics system configured for use as the avionics system of any other aspect.

In another aspect of the invention there is provided an aircraft structure, for example a wing or fuselage comprising an uplock in accordance with any other aspect of the invention. A retractable landing gear may be mounted on the wing or fuselage. The wing or fuselage may comprise an uplock configured to constrain the landing gear when the landing gear has been retracted. The wing may comprise a fixed portion and a wing-tip device. The wing may comprise an uplock mounted on the fixed portion to constrain the wing-tip device via a capture pin mounted on the device. The aircraft may be a commercial passenger aircraft, for example an aircraft capable of carrying more than fifty passengers, for example more than one hundred passengers.

It will of course be appreciated that features described in relation to one aspect of the present invention may be incorporated into other aspects of the present invention. For example, the method of the invention may incorporate any of the features described with reference to the apparatus of the invention and vice versa. The various elements of an uplock, including but not limited to the hook, the lock, the indicator member, the biasing mechanism, the cam, the main body, the casing, the cam surface and/or the avionics system described in connection with one aspect of the invention may be present in an uplock or aircraft in accordance with any other aspect of the invention. It will also be appreciated that one or more of the different aspects described above may be combined in a single uplock.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 2:
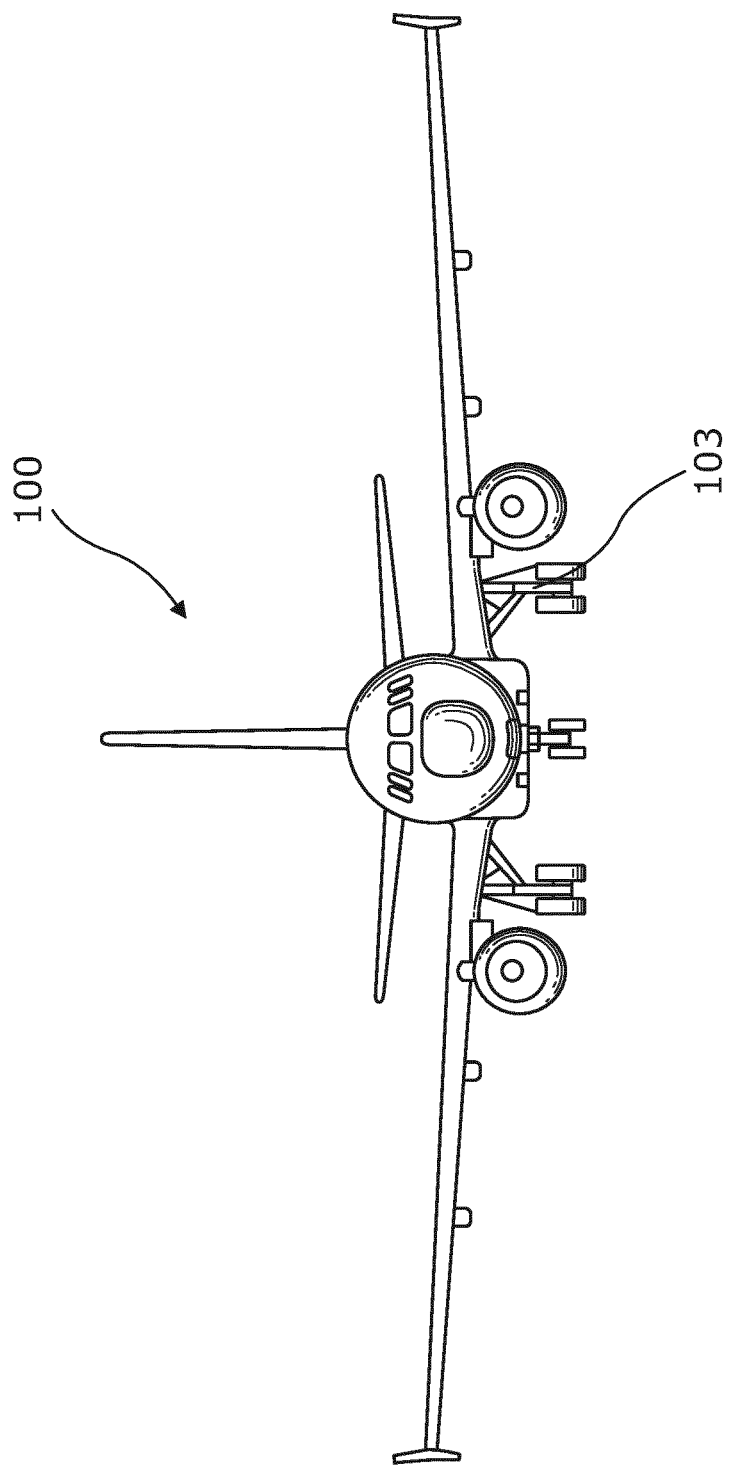
FIG. 2 shows a schematic view of an aircraft including a landing gear uplock according to a first example embodiment of the invention

FIG. 2 shows an aircraft 100 comprising a landing gear 103 having a capture pin 126 (not shown in FIG. 2) mounted thereon, and an uplock 101 (not shown in FIG. 2) and an avionics system (not shown in FIG. 2) in accordance with a first example embodiment of the invention. While the following embodiments are discussed in the context of a retractable landing gear, it will be appreciated that the capture pin 126 may be mounted on a folding wing tip.

FIG. 3 shows a schematic view of a landing gear uplock 101 according to the first embodiment in (a) the open and unlocked and (b) the closed and locked configuration. It will be appreciated that an uplock contains other elements not shown here for the sake of clarity. Only those elements of the uplock 101 which differ from the prior art uplock 1 of FIG. 1 will be discussed here. Like reference numerals denote like elements (for example the uplock of FIG. 1 is labelled with reference numeral 1 and the uplock of FIG. 3 is labelled with reference numeral 101). In addition to the elements of the uplock 1 of FIG. 1, the uplock 101 of the first embodiment comprises an L-shaped indicator lever 130 mounted midway along its length for rotation about pivot point A. The uplock 101 also includes a stop 132 arranged to limit the clockwise movement of the indicator lever 130, and a biasing spring 134 connected at one end to the indicator lever 130 above the pivot point A and at the other end to the main body 122 at a point to the right of the hook 102. The upper end of the indicator lever 130 includes a sensor target 136, and a corresponding proximity sensor (not shown) connected to avionics system 146 is mounted on the main body 122. The main body 122 has an eyelet 124 at its upper end for securing the uplock 101 to the aircraft 100.

Figure 1A:
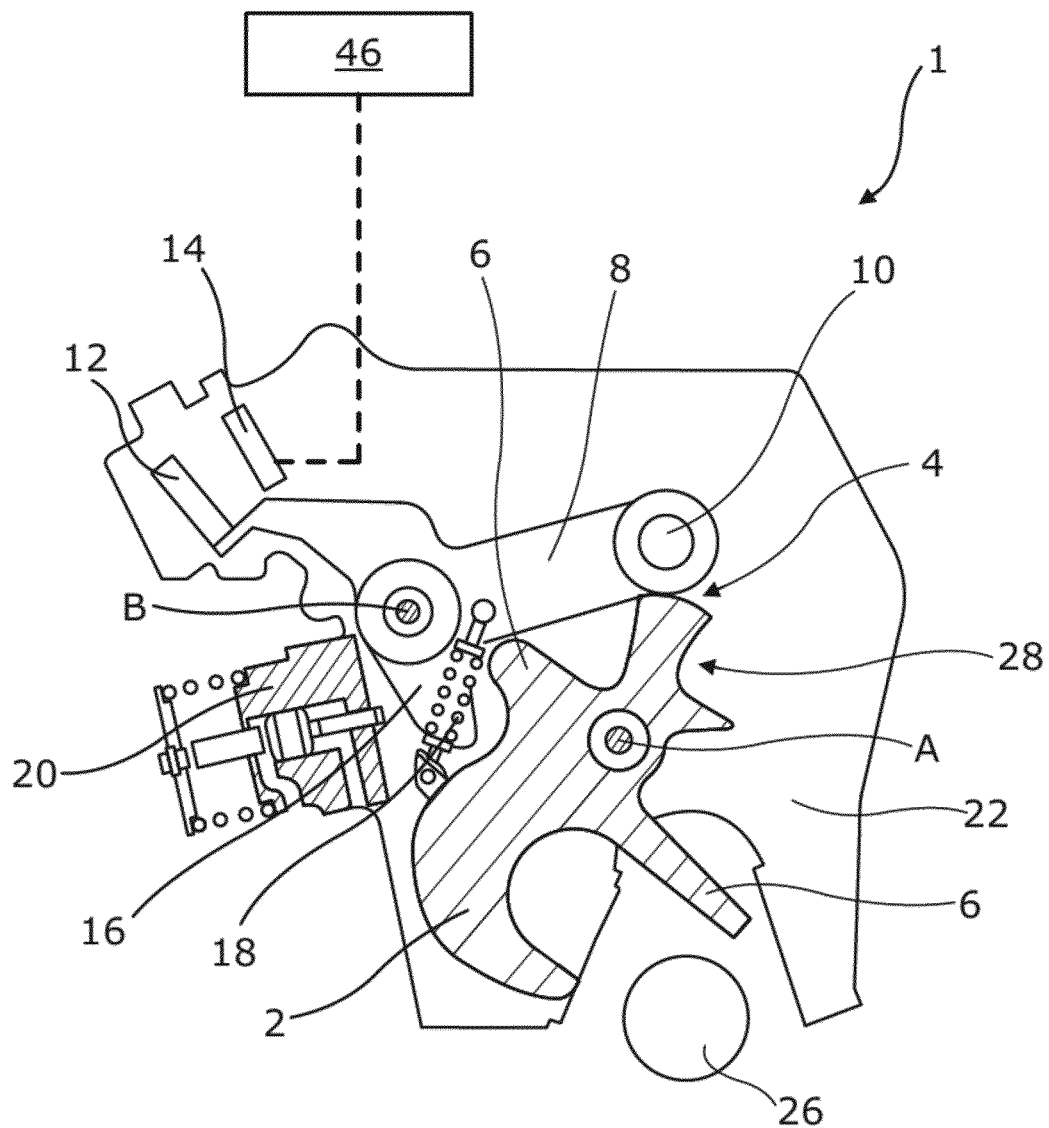
FIG. 1 shows a schematic view of a prior art uplock in (a) the open and (b) the locked configuration.
Figure 1B:
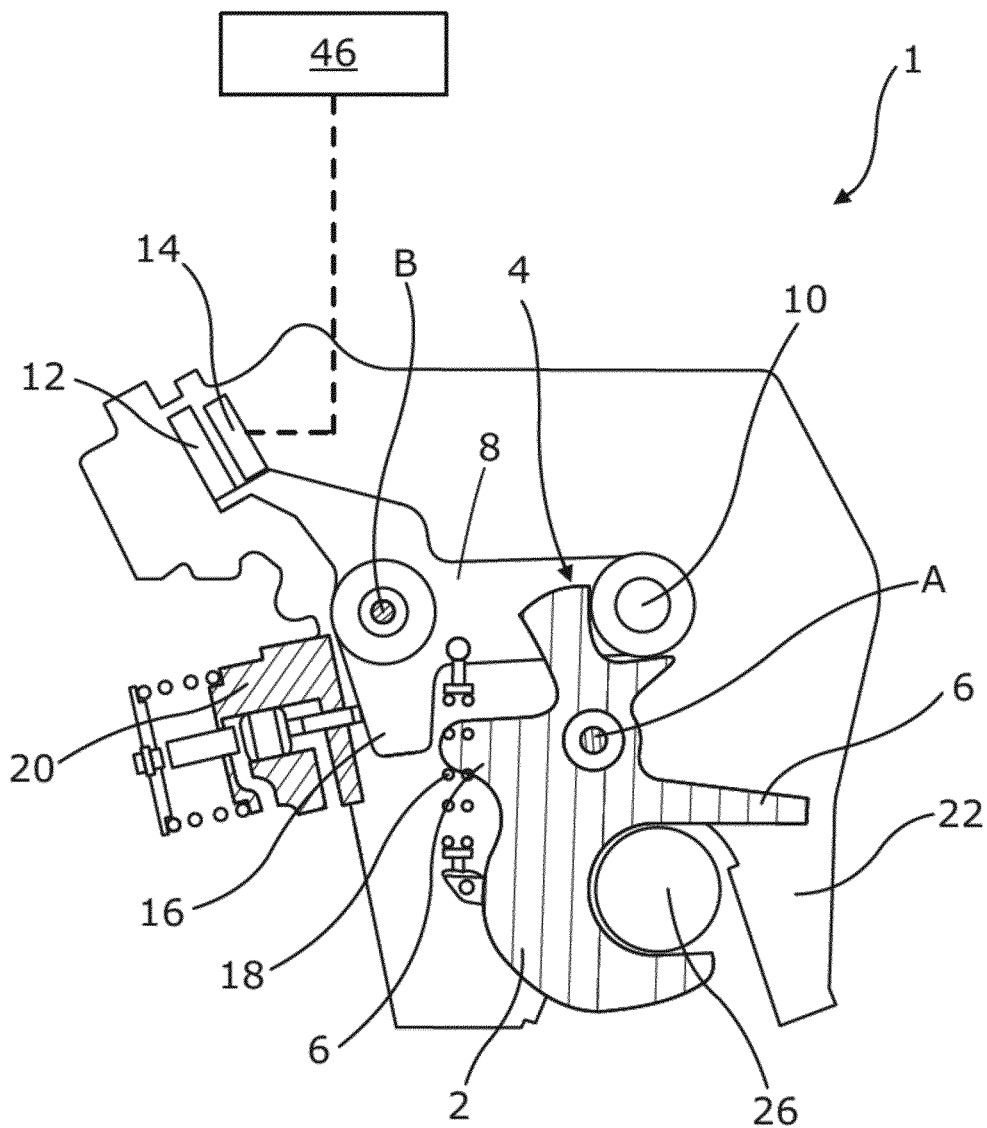
Figure 3A:
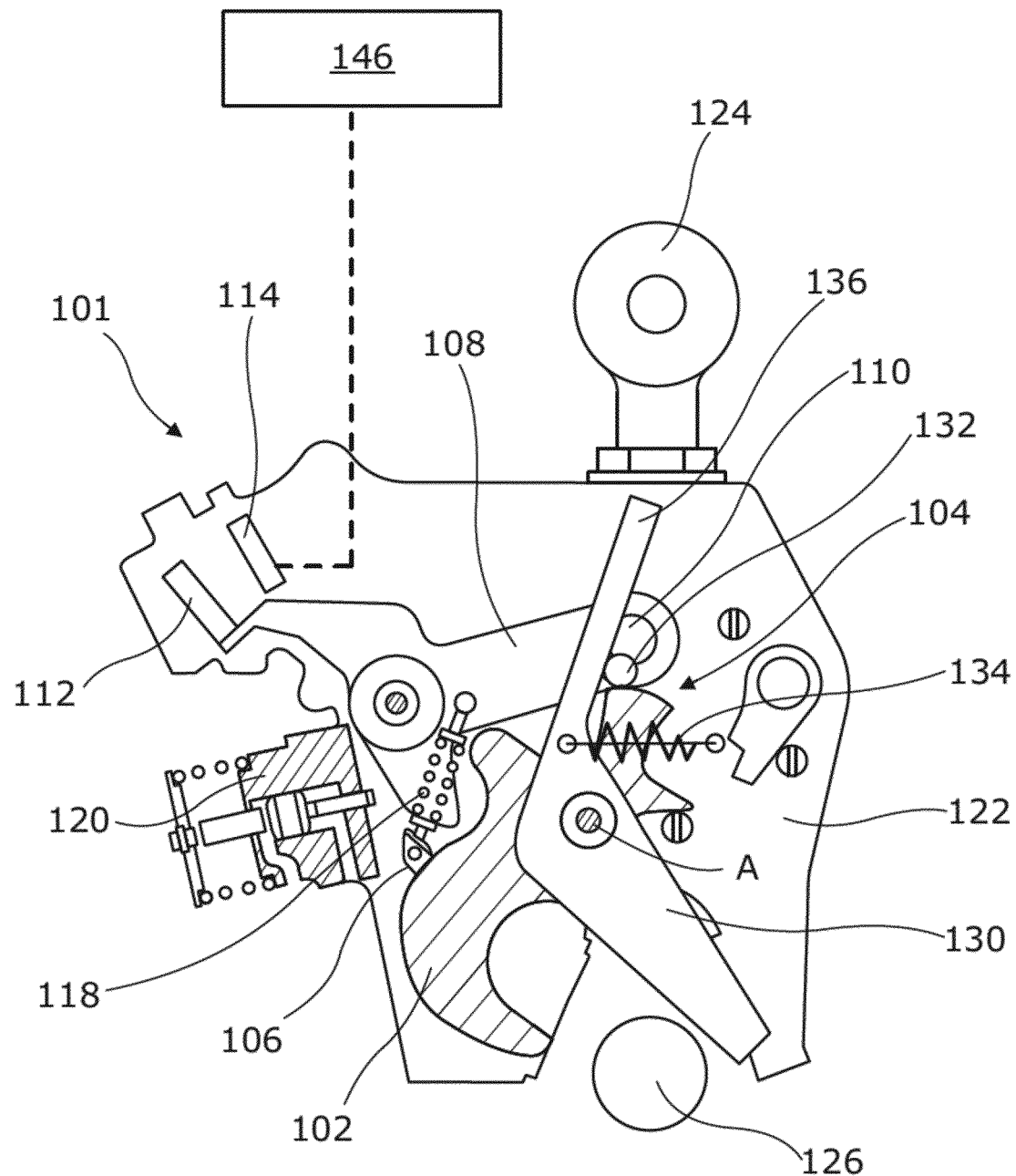
FIG. 3 shows a schematic close-up view of part of an uplock in accordance with the first example embodiment in (a) the open and (b) the closed configuration.
Figure 3B:
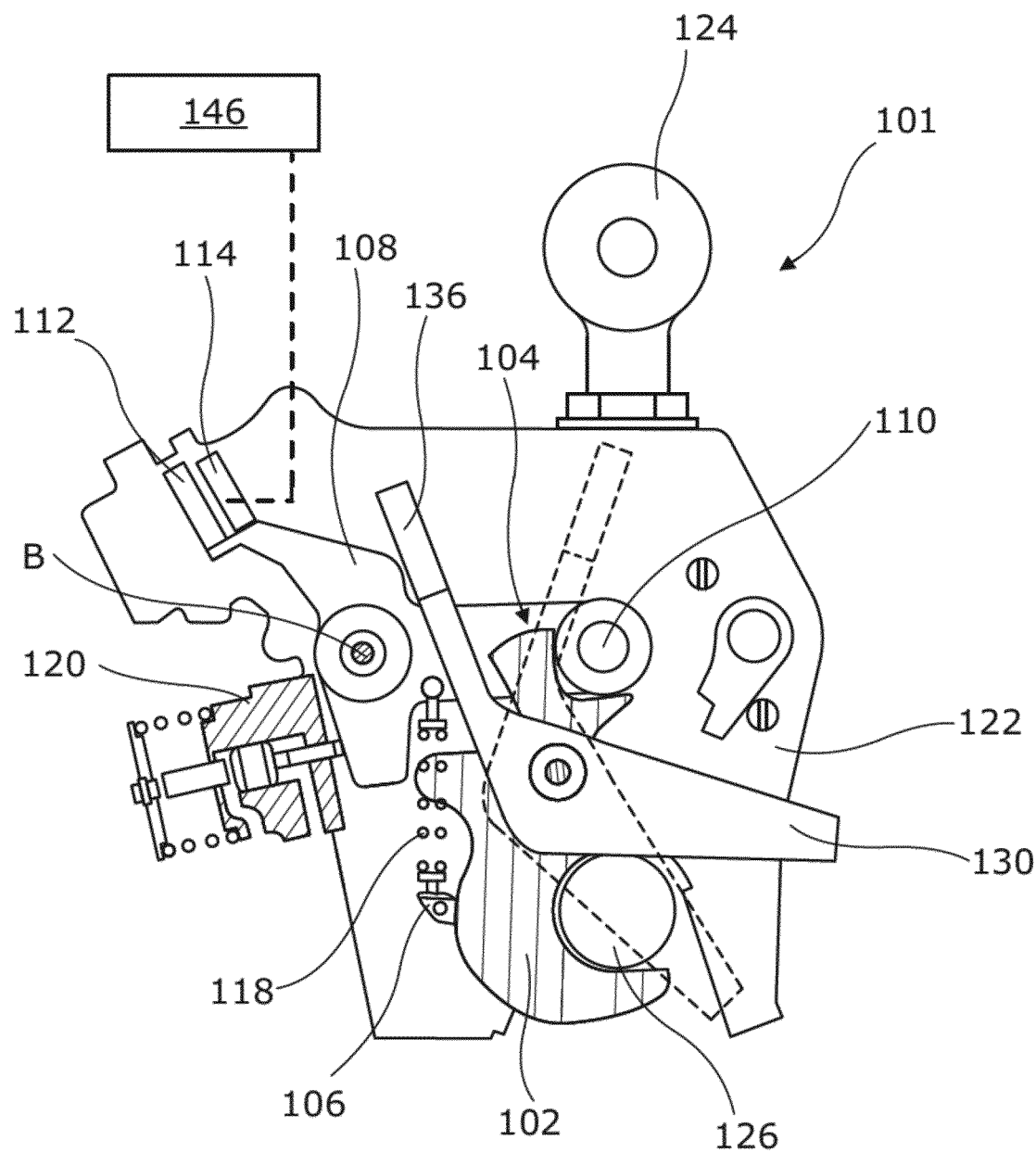

In the open configuration of FIG. 3(a) the arrangement of the hook 102 and locking lever 108 is as discussed for FIG. 1(a) above. The indicator lever 130 is held against the indicator stop 132 by the biasing spring 134, and the target 136 on the indicator lever 130 is spaced apart from the corresponding sensor. Again, in the locked configuration of FIG. 3(b) the arrangement of the hook 102 and locking lever 108 is as discussed for FIG. 1(b) above. The indicator lever 130 is rotated anti-clockwise about pivot point A relative to its position in FIG. 3(a) such that the upper part of the indicator lever 130 is spaced apart from the stop 132 (not shown separately in FIG. 3(b)) and the target 136 on the lever 130 is adjacent to the corresponding sensor (also not shown separately in FIG. 3(b)). The position of the indicator lever 130 in the open configuration is indicated with a dashed line in FIG. 3(b).

In use, the capture pin 126 contacts the hook 102 as the landing gear 103 retracts and rotates the hook 102 anti-clockwise from the open to the closed position as discussed above. As this happens, the upper side of the capture pin 126 also contacts the underside of the indicator lever 130 below the pivot point A, and pushes that portion of the indicator lever 130 upwards, causing the lever 130 to rotate anti-clockwise about point A thereby bringing the target 136 close to the proximity sensor. In the case that the hooked bottom portion of the hook 102 fails structurally, the capture pin 126 will drop down, and under the biasing action of the spring 134 (not shown separately in FIG. 3(b)), the indicator lever 130 will rotate clockwise until it contacts the stop 132, and the indicator target 136 is spaced apart from the sensor. As for the prior art assembly of FIG. 1, with the locking lever target 112 adjacent the relevant sensor 114 a 'locked' signal is provided to the avionics system 146. In uplocks in accordance the present embodiment, with the indicator target 136 adjacent the relevant sensor an 'up' signal is provided to the avionics system 146. In the case that the locking lever sensor indicates 'locked' but the indicator lever sensor is not indicating 'up' then the avionics system 146 alerts the pilot that there is a potential uplock failure. Thus, uplocks in accordance with the present embodiment would detect the previously hidden failure mode whereby the hooked portion of the hook 102 fails, but the remains of the hook 102 stay in the closed position and therefore the locking lever 108 remains in the locked position, so that the locking sensor 114 still indicates 'locked'.

In a variation of the first embodiment (not shown) the dimensions of the indicator lever 130 are altered such that in the locked position both the locking lever target 112 and the indicator lever target 136 are adjacent to the same sensor. Thus, uplocks in accordance with this embodiment may allow for the detection of the previously hidden failure mode without the need for an additional sensor.

Figure 4:
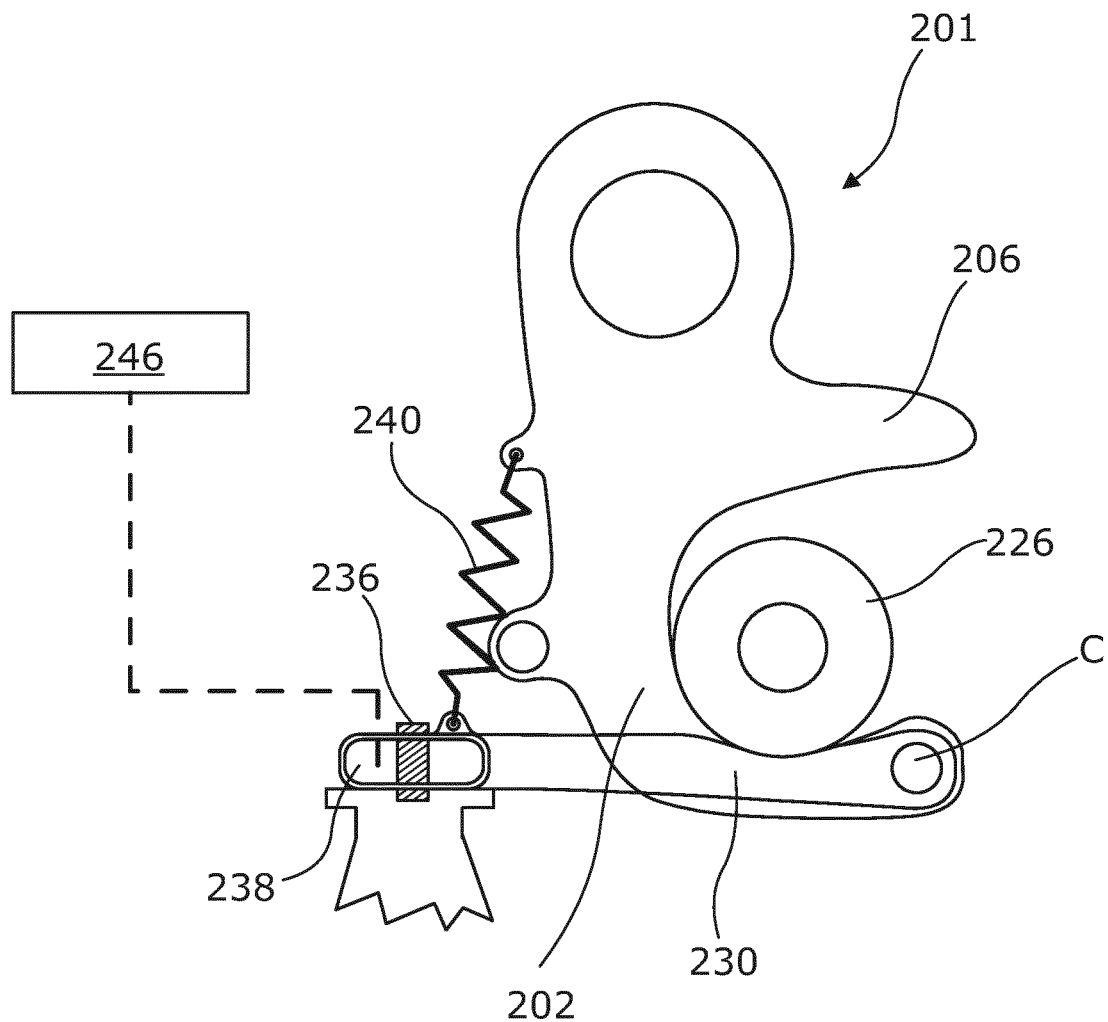
FIG. 4 shows a schematic view of a part of an uplock in accordance with a second example embodiment.

FIG. 4 shows a hook 202 for use in an uplock 201 in accordance with a second example embodiment, with the hook 202 in the closed position. Only those elements of the second embodiment which differ with respect to the first embodiment will be described here. Like reference numerals indicate like elements. In this embodiment, an indicator bar 230 extends across the lower, hooked, portion of the hook 202, and is mounted at one end for pivotal movement about a point labelled C in FIG. 4, which is adjacent to the tip of the hook 202. A spring 240 connects the other (second) end of the bar 230 to the left-hand side of the hook 202. A sensor target 236 is located at the second end of the bar 230. A proximity sensor 238 is mounted on the casing (not shown in FIG. 4) in the region of the second end of the bar 230 and is connected to avionics system 246. A pin 226 is received in the hook 202 and rests on the upper side of the bar 230.

In use, when a pin 226 is received in the hook 202 (as shown in FIG. 4) the pin 226 presses the indicator bar 230 down, against the action of the spring 240, such that the sensor target 236 is adjacent to the proximity sensor 238. With the target 236 adjacent the sensor 238, an 'up' signal is provided to the aircraft systems 246. In the case that the hook 202 fails or some other failure occurs that causes the pin 226 to no longer be engaged with the hook 202, the spring 240 acts to lift the second end of the indicator bar 230, thereby moving the target 236 away from the sensor 238. As in the first embodiment, if the locking sensor (not shown separately in FIG. 4) is providing a 'locked' signal, but the indicator sensor 238 is not providing an 'up' signal, the pilot can be alerted to the possibility that the hook 202 has failed by the avionics system 246.

Figure 5:
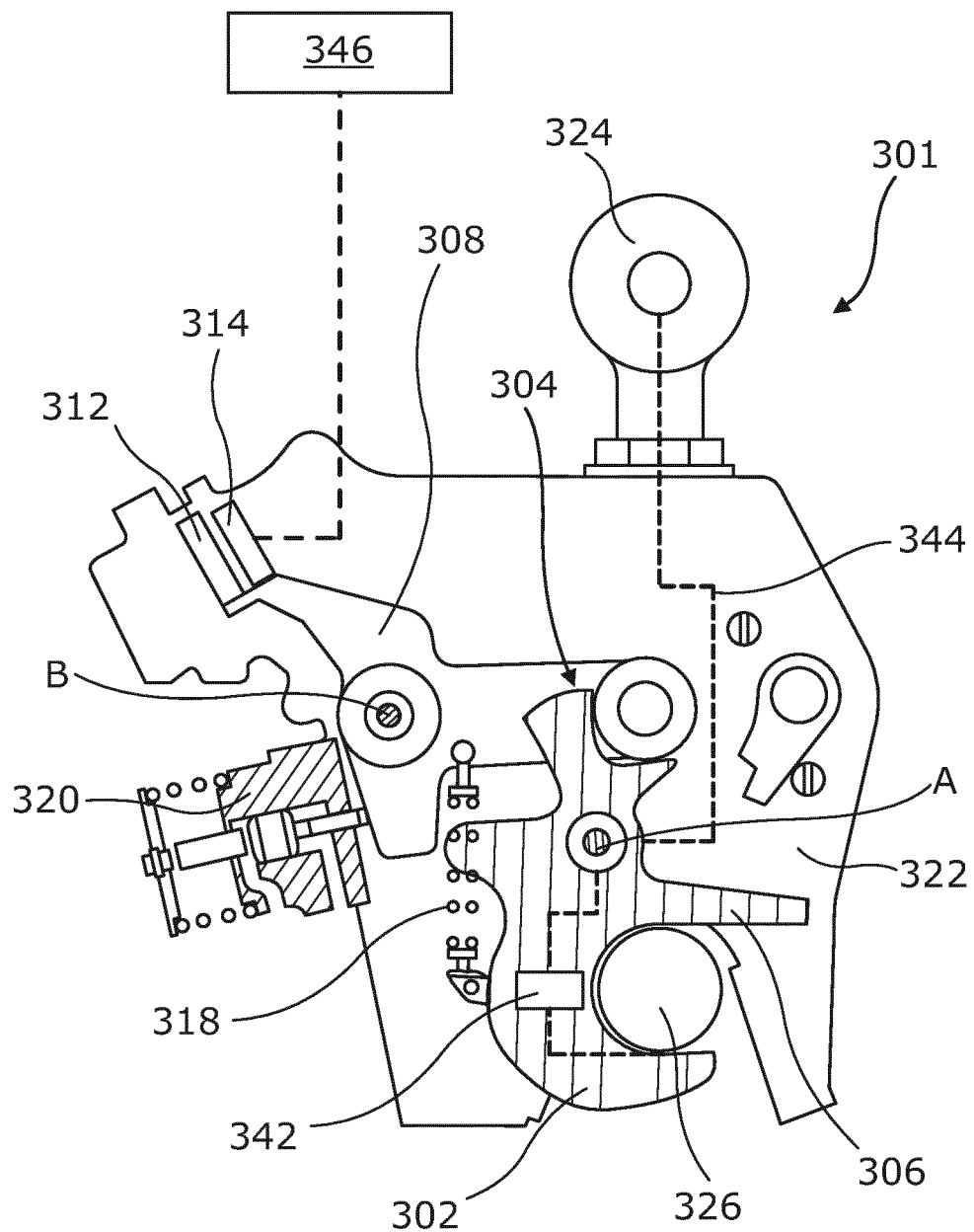
FIG. 5 shows a schematic view of part of an uplock in accordance with a third example embodiment.

FIG. 5 shows an uplock 301 in accordance with a third example embodiment. Only those elements of the present embodiment which differ with respect to the first embodiment will be described here. Like reference numerals indicate like elements. Instead of the indicator lever 130 of FIG. 3, the FIG. 5 embodiment includes a strain gauge 342 located at a position on a load path (denoted schematically by a dotted line 344 in FIG. 5) which extends between the hook 302 and the eyelet 324 via pivot point A and the casing 322. It will be appreciated by the skilled person that the load path 344 as shown in FIG. 5 is a schematic representation of an example load path, and that the main load path would in reality likely not have right-angle changes in direction and would instead follow a more curved and smooth path. The strain gauge is located on the load path 344 on the hook 302 in the present embodiment, but it will be appreciated that it can be located anywhere along the main load path, or anywhere sufficiently close to the main load path that a clear distinction can be made between the loaded and unloaded state of the uplock hook 302. It will also be appreciated by the skilled person that the strain gauge may be located anywhere on the aircraft in a location near enough to the attachment point of the uplock, such that the area undergoes different strain when the capture pin of the aircraft component is engaged in the hook when the hook is in the closed position, compared to when the capture pin is not engaged with the hook when the hook is in the closed position. In use, the strain gauge provides a signal corresponding to a measurement of the strain in the hook 302 to the avionics system 346 (the connection between the strain gauge 342 and avionic system 346 is not shown in FIG. 5 for clarity). Where the signal corresponds to a strain above a predetermined threshold value, for example a threshold strain that corresponds to a load of 30 kN, the presence of a pin 326 in the hook 302 is indicated. Again, if the locking sensor 314 indicates 'locked' but the measured strain is below the threshold value, the pilot can be alerted to the possibility that the hook 302 has failed by the avionics system 346. Thus, uplocks in accordance with this embodiment may allow for the detection of the previously hidden failure mode without the need for the additional mechanical elements of FIGS. 3 and 4.

The third embodiment thus provides more generally an apparatus for detecting when a retractable aircraft landing gear is in the up and locked position, the apparatus comprising (a) an uplock having a support member (for example a hook, hanger, latch, or similar device or part) configured to lock the landing gear in position when the landing gear is retracted as a result of the support member engaging a part of the landing gear (for example a capture pin, a bar, a latch device, whether directly attached to the leg of the landing gear or otherwise forming a part or being attached to the landing gear); (b) a load cell configured for detecting when the support member is reacting at least some load from the landing gear when in the up and locked position (for example being mounted, in use, at a location on the aircraft along a load path to or from the part of the landing gear which is engaged by the support member, the load path optionally also extending to and/or across a region of said part of the landing gear); and (c) a control unit (for example, which may be in the form of the avionics system, may be connected to the avionics system, may be a standalone indicator system, may be a processor or comparator than provides a simple output signal, or otherwise) configured to receive a signal from the load cell and configured to determine, with the use of the signal from the load cell (and possibly other data, signals, or the like) if the landing gear is both retracted and locked in the retracted position by the uplock. The control unit provides an output, for example in the form of an up-and-locked indication. The output may be an electronic output, a visual output, or otherwise. The load cell may be located to measure the load at one or more positions along the load path. For example, a load cell may be located to one side or the other of said part of the landing gear (e.g. capture pin)—i.e. not forming a part of or being contained by the capture pin itself. A load cell may be located in or on the support member (e.g. the hook). A load cell may be located in or on said part of the landing gear (e.g. the capture pin). A load cell may be may be positioned at a location in or on a hinge-axis, an axle or shaft or the like—not being the capture pin—for example the axle or shaft of the axis about which the support member is arranged to rotate (or alternatively, no load cells may be positioned in such locations). A load cell may be may be located in or on the casing of the uplock. A load cell may be may be located in or on aircraft structure which holds the uplock or otherwise reacts loads from the uplock. The present embodiment also enables the performance of a method of confirming both that a landing gear on an aircraft is retracted and that a capture pin associated with the landing gear is locked, the method comprising the steps of measuring a load at a location on a load path to either side of the capture pin.

Figure 6A:
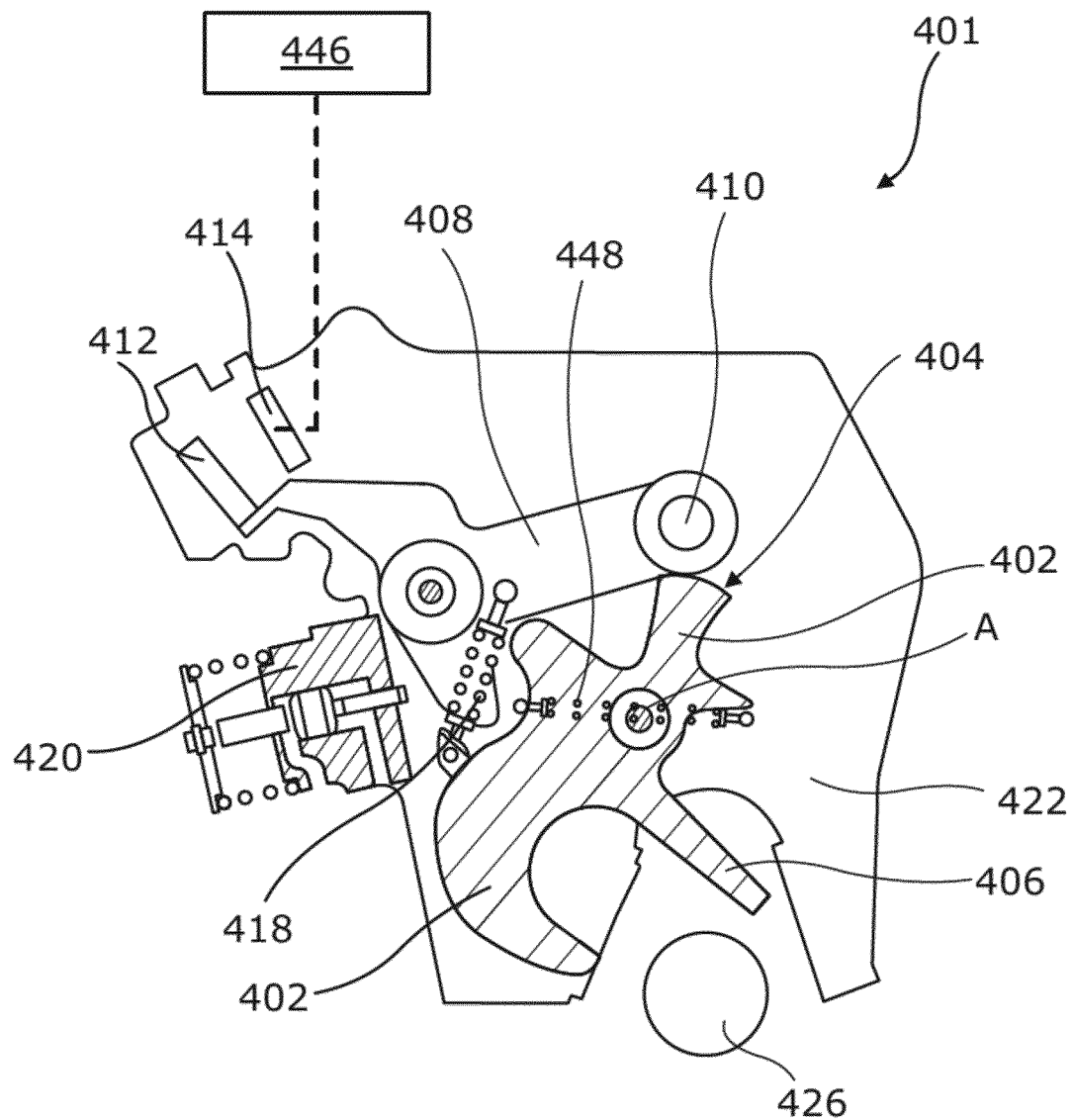
FIG. 6 shows a schematic view of part of an uplock in accordance with a fourth example embodiment in (a) the open and (b) the closed configuration.
Figure 6B:
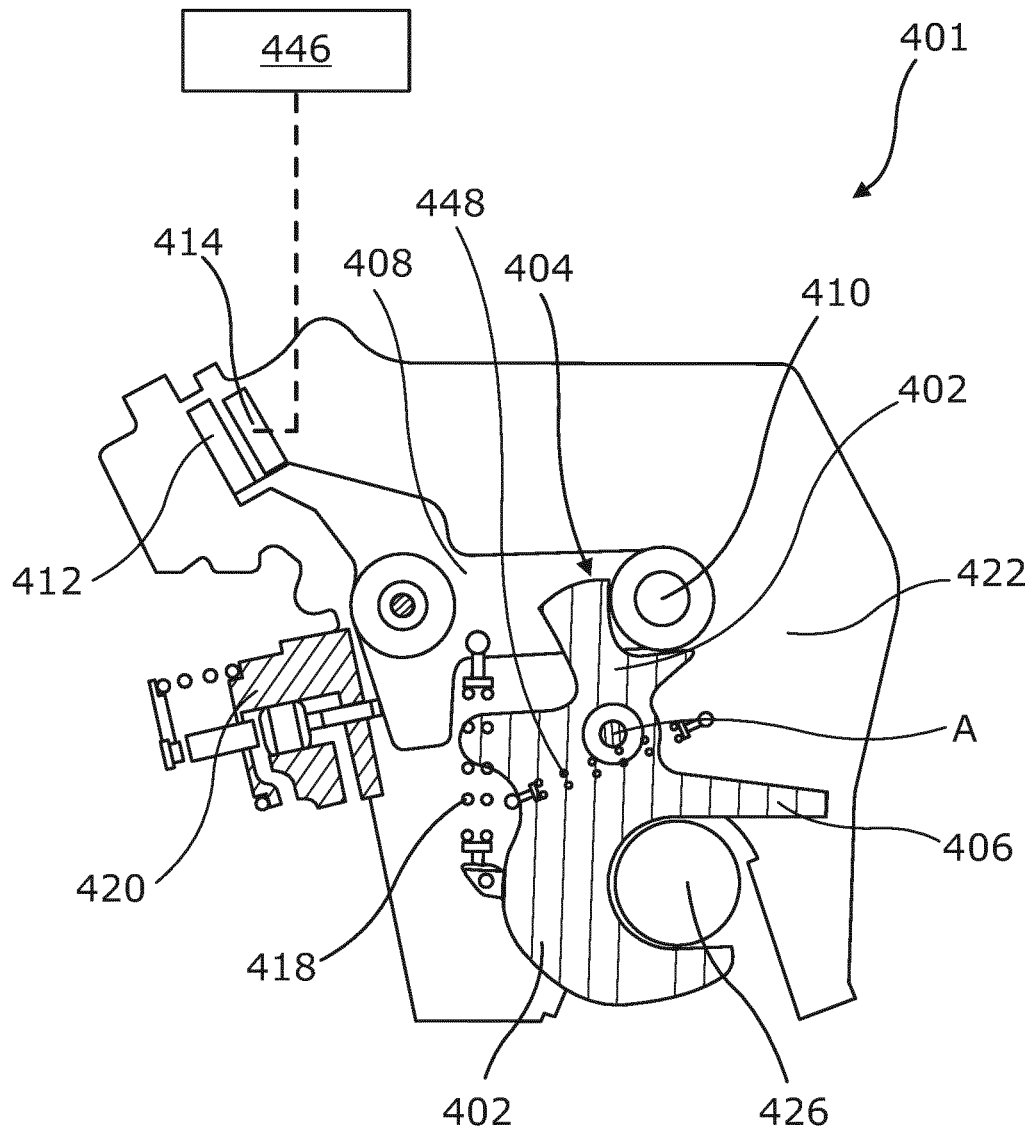

FIGS. 6(a) and (b) show an uplock 401 in accordance with a fourth example embodiment in (a) the open and unlocked and (b) the closed and locked configuration. Only those elements of the present embodiment which differ with respect to the prior art uplock 1 of FIG. 1 will be discussed here. Like reference numerals denote like elements. In addition to a spring 418 that extends between the hook 402 and the locking lever 408 as in the prior art uplock, the present embodiment includes a biasing spring 448 that is attached at one end to the left-hand side of the hook 402 and at the other end to the main body 422 at a point to the right-hand side of the hook 402. The biasing spring 448 passes above the pivot point A when the uplock 401 is in the open configuration of FIG. 6(a) and beneath pivot point A when the uplock 401 is in the closed and locked configuration of FIG. 6(b).

As in the uplock of the prior art, when the locking lever 408 is released by the actuator 420, the tension spring 418 acts to rotate the hook 402 clockwise towards the open position. However, in the present embodiment, the biasing spring 448 acts in the opposite direction to hold the hook 402 in the closed position. The two springs 418, 448 are balanced such that the additional clockwise force provide by the weight of the pin 426 when engaged in the hook 402 is required to overcome the force provided by the biasing spring 448 and for the spring 418 to open the hook 402. Once the hook 402 has rotated beyond a certain point spring 448 is located above pivot point A and therefore no longer acts to urge the hook 402 towards the closed position. In the case that the pin 426 is not present in the hook 402 because the lower portion of the hook 402 has failed, the hook 402 will remain in the closed position when the locking lever 408 is lifted by the actuator. When uplock release is no longer commanded and actuator 420 is released the locking lever 408 will drop back into the locking recess 428 on the top of the hook 402 which has stayed in the closed position, and the locking lever sensor 418 will provided a 'locked' signal to the avionics system 446. However, the landing gear will have deployed and (via other sensors not shown) will provide a 'downlocked' signal to the avionics system 446. This combination of a 'locked' signal from the uplock and a 'downlocked' signal from landing gear causes the avionics system 446 to alert the pilot that an uplock failure may have occurred. Thus, uplocks in accordance with the present embodiment may allow for the detection of a previously hidden failure mode.

Figure 7A:
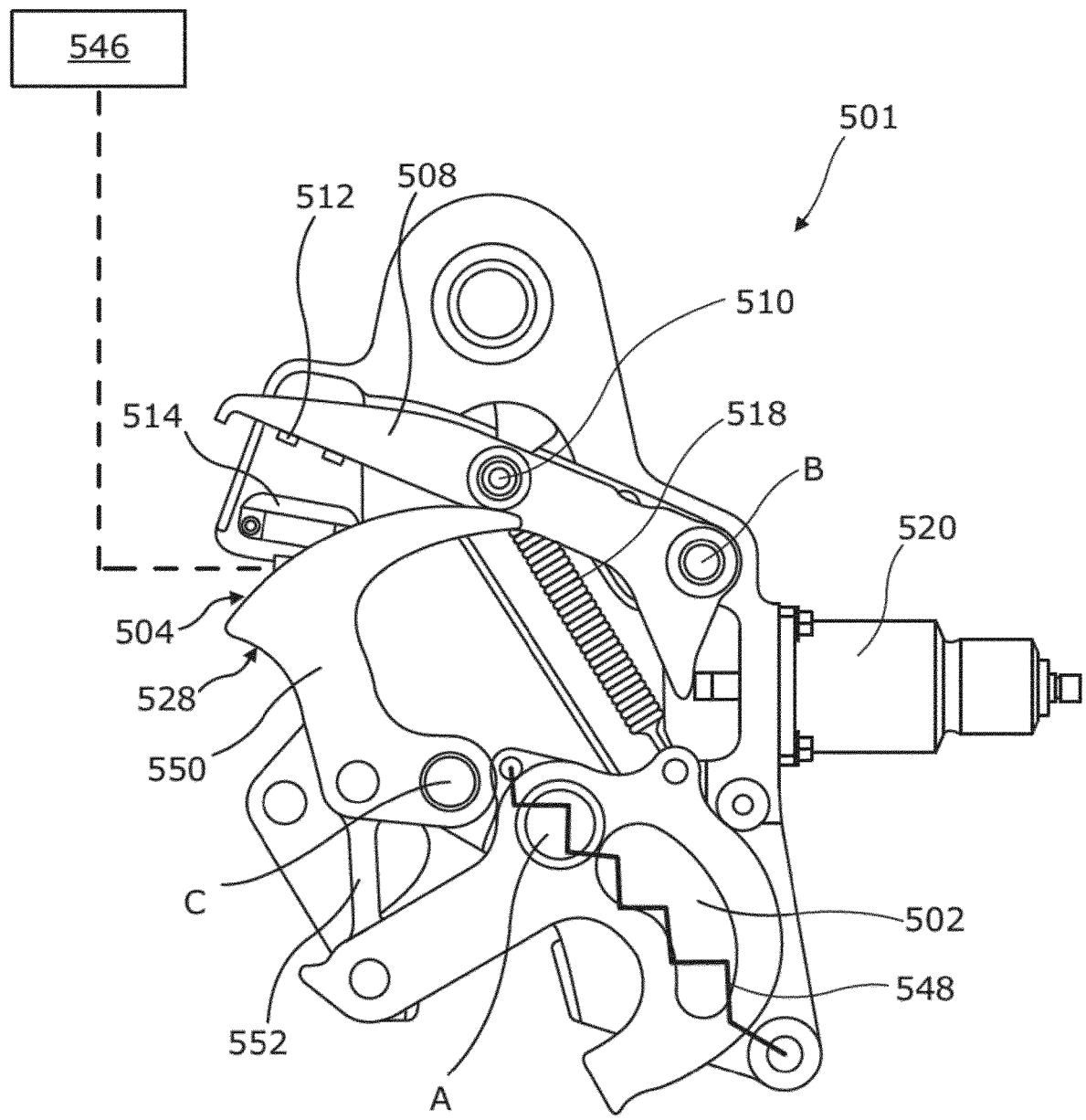
FIG. 7 shows a schematic view of part of an uplock in accordance with a fifth example embodiment in (a) the open and (b) the closed configuration.
Figure 7B:
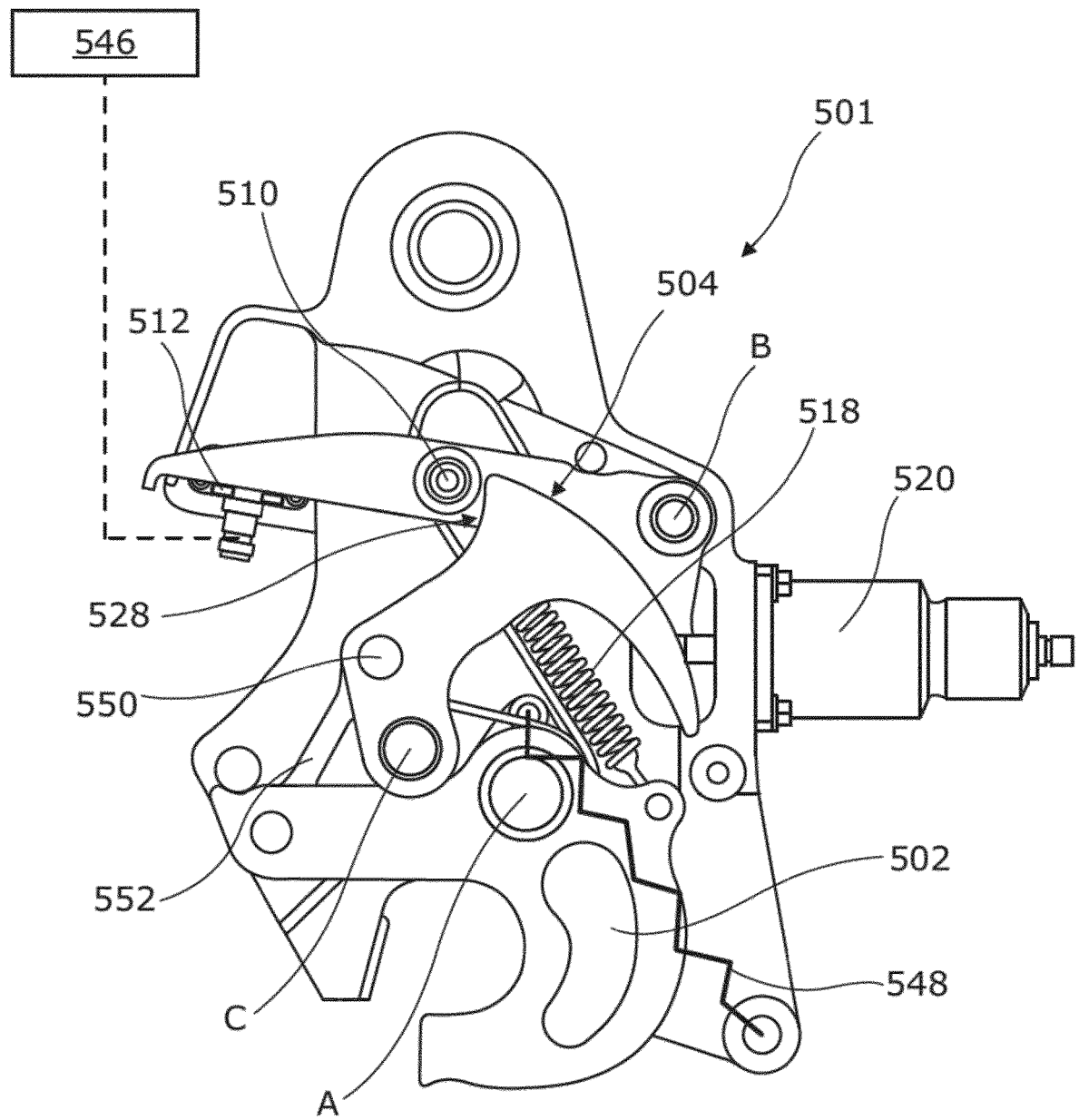

FIGS. 7(a) and 7(b) show a fifth example embodiment of the invention in (a) the open and unlocked and (b) the closed and locked configuration. Only those elements of the present embodiment which differ with respect to the FIG. 6 embodiment will be discussed here. Like reference numerals denote like elements. In the present embodiment, the cam surface 504 is provided on a separate cam 550, rather than as part of the hook 502. The cam 550 is mounted for pivotal movement about a pivot point C and a linkage 552 extends between the hook 502 and the cam 550. In use, as the pin 526 moves upwards it contacts the hook 502 which rotates clockwise about point A. The linkage 552 between the hook 502 and the cam 550 causes the cam 550 to rotate clockwise about point C. This continues until the hook 502 is in the closed position and the roller 510 on the locking lever 508 drops into a recess 528 at the left-hand end of the cam surface 504 locking the hook 502 in place. Once the locking lever 508 is in the recess 528 the cam 550 is prevented from rotating anti-clockwise and the linkage 552 between the cam 550 and the hook 502 prevents the hook 502 from moving out of the closed position. When the locking lever 508 is released by the locking actuator 520, the hook 502 returns to the open configuration under the action of the springs 518, 548 provided that the pin 526 is providing the additional necessary force on the hook 502, to overcome the balance between springs 518, 548 as in the FIG. 6 embodiment.

Figure 8A:
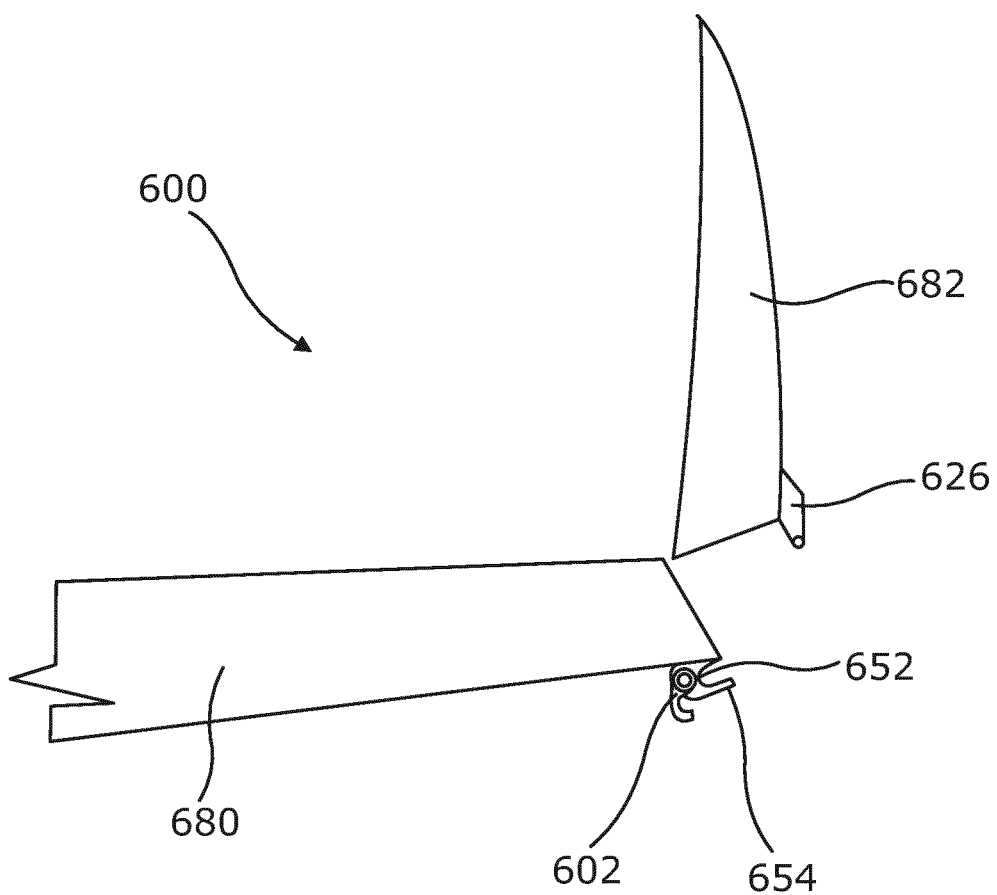
FIG. 8 shows a schematic view of part of a wing including an uplock in accordance with a sixth example embodiment, with the wing in (a) the ground and (b) the flight configuration.
Figure 8B:
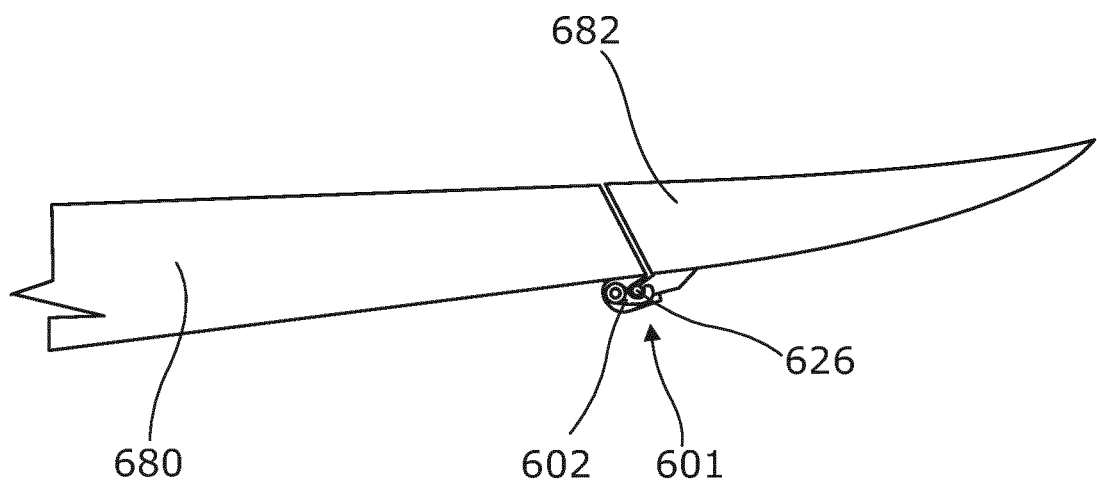

FIGS. 8 (a) and (b) show a schematic view of an aircraft wing 600 comprising a fixed portion 680 and a folding wing tip 682 in (a) the ground configuration and (b) the flight configuration. An uplock 601 (shown in more detail in FIG. 9) in accordance with a sixth example embodiment of the invention is shown mounted on the underside of the fixed wing portion 680 (it will be appreciated that in reality the uplock is located within the wing box, but is visible in FIG. 8 for the purposes of illustrating the invention). The uplock 601 comprises a stop 654 having u-shaped pin recess 652 and a hook 602. A pin 626 is mounted to the underside of the wingtip device 682. In the ground configuration of FIG. 8(a) the wing tip 682 is at a right angle to the pitch axis of the aircraft, and the pin 626 is spaced apart from the uplock 601. In the flight configuration of FIG. 8(b) the wing tip 682 is aligned with the fixed portion of the wing 680 such that the upper and lower surfaces of the fixed portion 680 and wing tip 682 are continuous. The pin 626 is located in the pin recess 652 and the hook 602 has rotated upwards and is engaged with the pin 626. In use, the hook 602 prevents the wing tip device 682 from rotating anti-clockwise towards the ground configuration.

Figure 9:
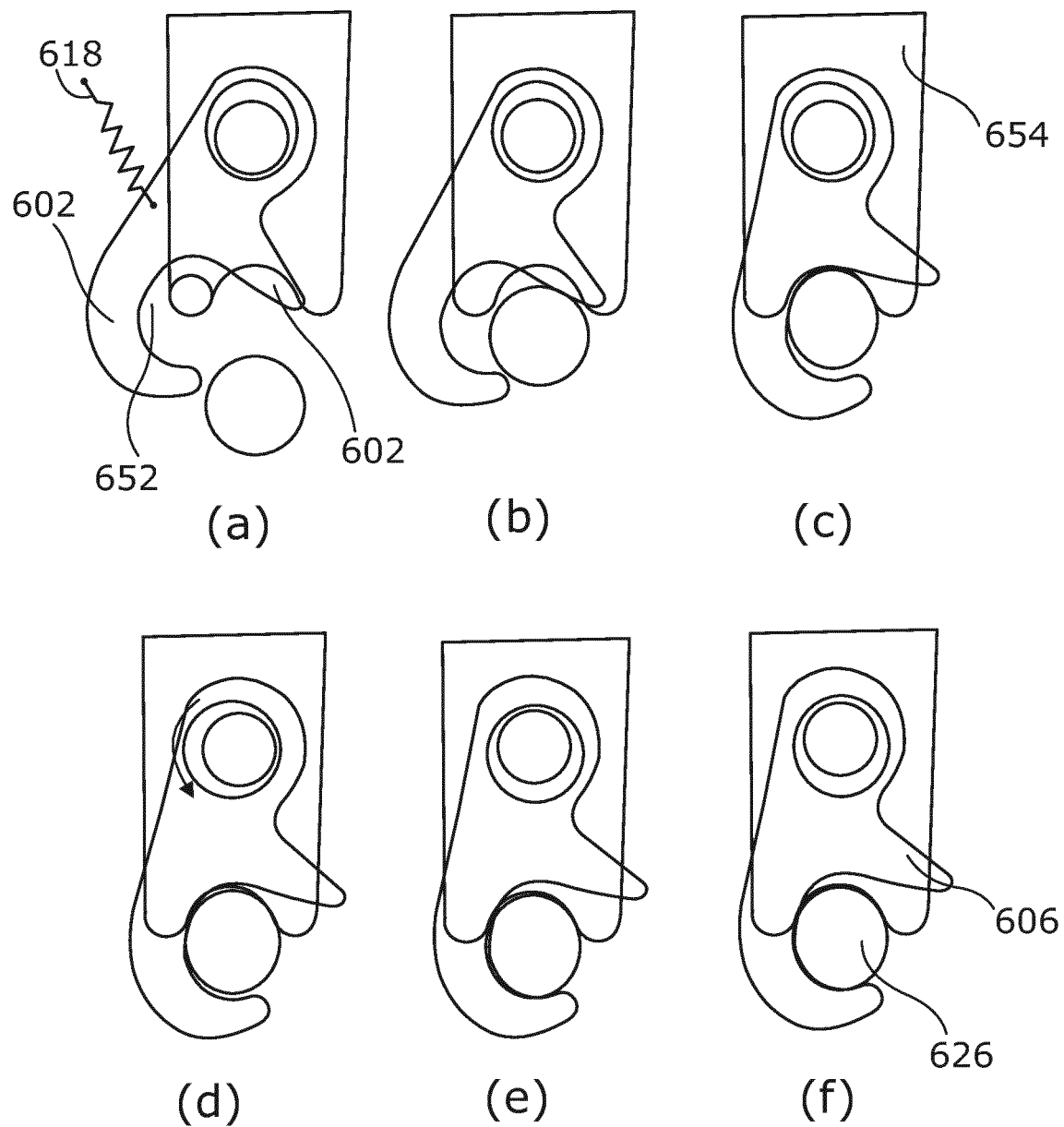
FIGS. 9 (a) to (f) show a schematic view of part of an uplock in accordance with the sixth example embodiment at various points in the locking process.

FIG. 9 (a) to (f) show a close up of part of the uplock 601 of the sixth embodiment. The uplock 601 comprises a hook 602 having an arm 606 extending from its right-hand side. The hook is mounted on an eccentric bush 656 for rotation about a first point, which itself rotates about a second point. The uplock further comprises a stop 654 having a u-shaped pin recess 652 at one end, the recess 652 being sized and shaped to receive a portion of the capture pin 626. The other end of the stop 654 is mounted on the main body (not shown in FIG. 9).

A spring 618 (not shown in FIG. 9 (b) to (f)) holds the hook 602 in an open position in FIG. 9(a). In use, as the folding wing tip 682 moves from the ground configuration towards the flight configuration the pin 626 moves towards the uplock 601 until it contacts the arm 606, and begins to push the hook 602 anti-clockwise about the first point. The pin 626 continues to rotate the hook 602 until the pin hits the stop 654 and is received in the stop recess 652, see FIG. 9(c), at which stage the bottom portion of the hook 602 is spaced apart from the pin 626. The eccentric bush 656 is then driven to rotate, pulling the hook 602 towards the stop 654 and onto the pin 626, see FIG. 9(d) by rotating the first point about the second point. This driving and the resulting translational movement of the hook 602 continues, see FIG. 9(e) until, as shown in FIG. 9(f) the pin 626 is sandwiched between the hook 602 and the stop 654 and the centre of the pin 626 is aligned with the second point, the first point having moved 180 degrees around the second point. Uplocks in accordance with the present embodiment may be particularly advantageous where it is desirable to reduce movement of the aircraft component, as the motion of the hook 602 relative to the stop 654 reduces the gap around the pin 626 when the uplock 601 is locked, thereby reducing any movement of the wing tip device 682 when the wing tip in subject to the variation of aerodynamic loads in flight.

Figure 10A:
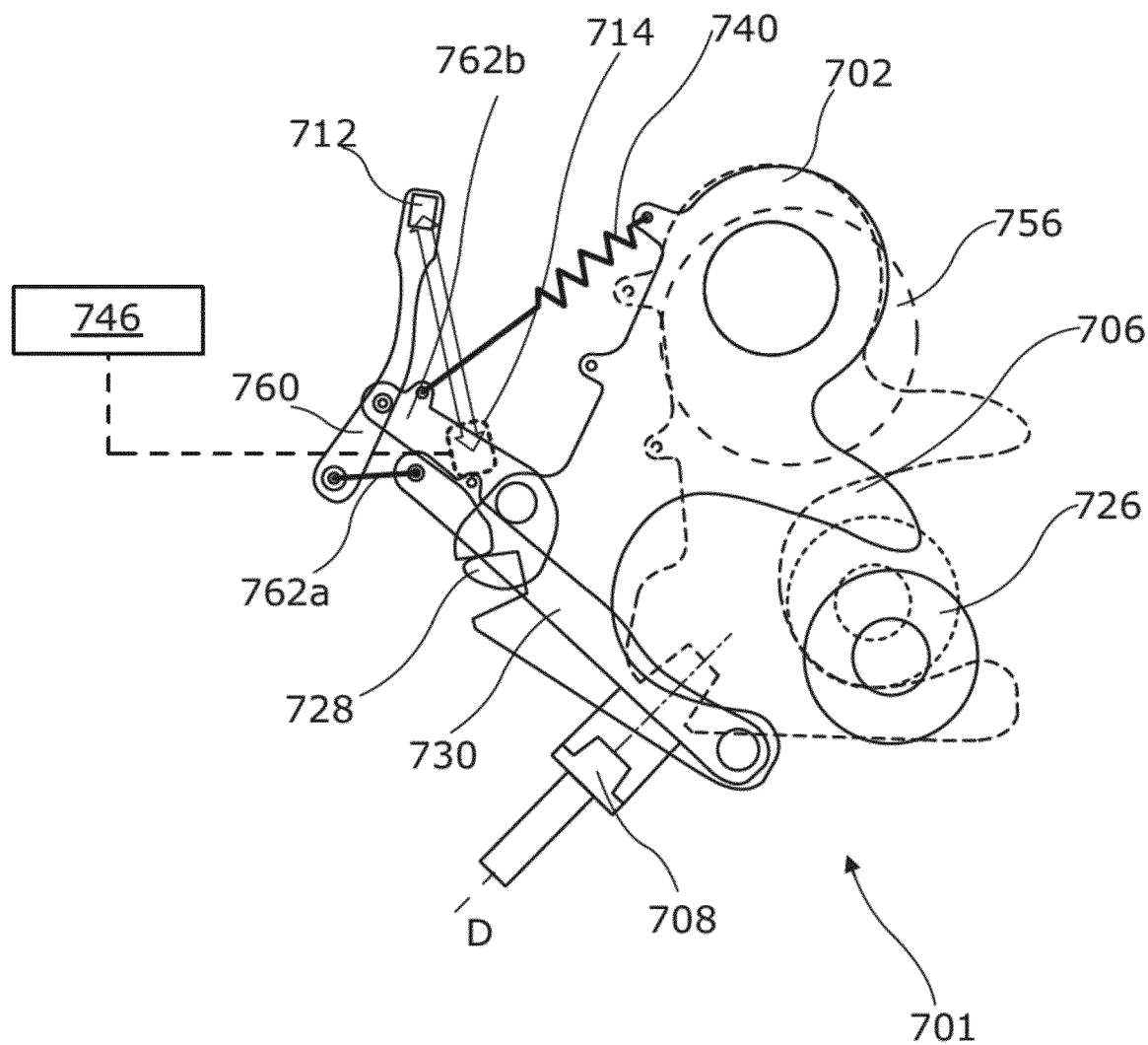
FIG. 10 shows a schematic view of part of an uplock in accordance with a seventh example embodiment in (a) the open and (b) the closed configuration.
Figure 10B:
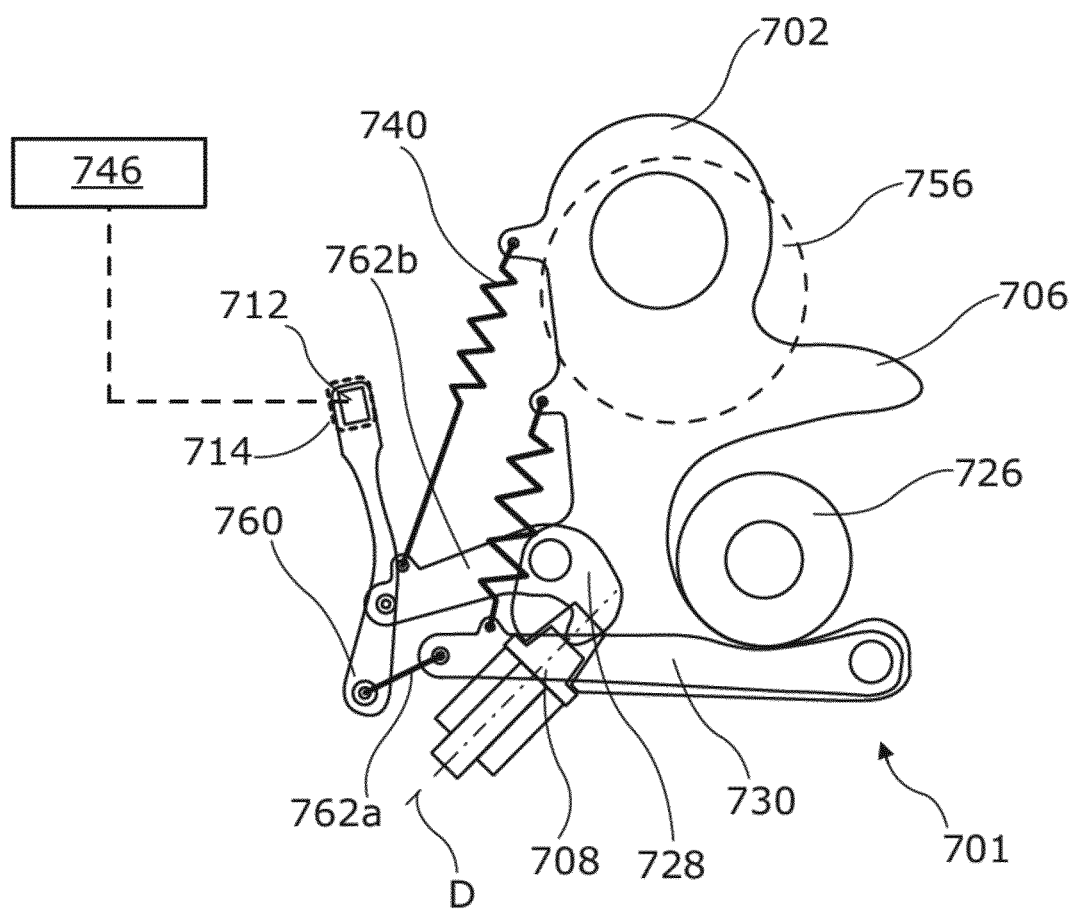

FIG. 10 shows part of an uplock in accordance with a seventh example embodiment of the invention in (a) the open and unlocked and (b) the closed and locked configuration. Only those elements of the present embodiment which differ with respect to the second embodiment will be discussed here. Like reference numerals denote like elements. In this embodiment the hook 702 is mounted on an eccentric bush 756. As in the second example embodiment the uplock 701 includes an indicator bar 730 that is pressed down by the pin 726 when the pin is received in the hook 702. In contrast to the second embodiment, a target 712 is not located on the indicator bar 730, but is instead mounted on a separate elongate member 760. The uplock also includes two links 762a and 762b each link 762 being pivotally connected at one end to the elongate member 760. The first link 762a is pivotally connected at the other end to the indicator bar 730. The second link 762b is pivotally connected at the other end to the hook 702. A spring 740 is connects to the second link 762b to the left-hand side of the hook 702. The bottom left-hand corner of the hook 702 includes a recess 728 sized to receive a locking piston 708 which is mounted for reciprocal movement along an axis labelled D in FIG. 10. The second link 762b extends to reach the recess 728. The location of a sensor 714 is indicated by a dashed line in FIG. 10. Sensor 714 is mounted on the casing (not shown) in the region of the second link 762b when the uplock 701 is in the open and unlocked configuration. In the closed and locked position, and when the pin is received in the hook, the target 712 is located in a region close to the sensor 714. In the event that either the pin 726 is not received in the hook 702, or that the hook 702 is in the open configuration, or that the hook is unlocked, or any combination thereof, the target 712 will be located at some distance further away from the sensor 714. When the target 712 is in the closest position to the sensor 714, the sensor provides an "up and locked" signal to the avionics system 746. When the target 712 is not in the closest position to the sensor 714, the sensor provides a signal to the avionics system 746 to alert the cockpit of a possible uplock fault.

In use the pin 726 contacts the underside of the hook arm 706 to rotate the hook 702. Once the pin 726 is received in the hook 702 it presses down on the indicator bar 730 which via its connections to links 762 moves the target 712 towards the sensor 714. Once the hook 702 has reached the closed position of FIG. 10(b), the locking piston 708 is moved into the recess 728 where it contacts second link 762b. The combination of the pin 726 pressing down on the indicator bar 730 and the locking piston 708 contacting the link 762b causes the links 762 to move the elongate member 760 to a position in which the sensor 714 and target 712 are nearer to each other (see FIG. 10(b). The sensor 714 then provides an 'up & locked' signal to the aircraft systems. The kinematics of the uplock 701 are such that the target 712 is only adjacent to the sensor 714 when the hook 702 is locked in the closed position and the pin 726 is in the hook 702. Thus, uplocks in accordance with the present embodiment may allow for detection of the previously hidden failure mode with a single sensor.

Figure 11A:
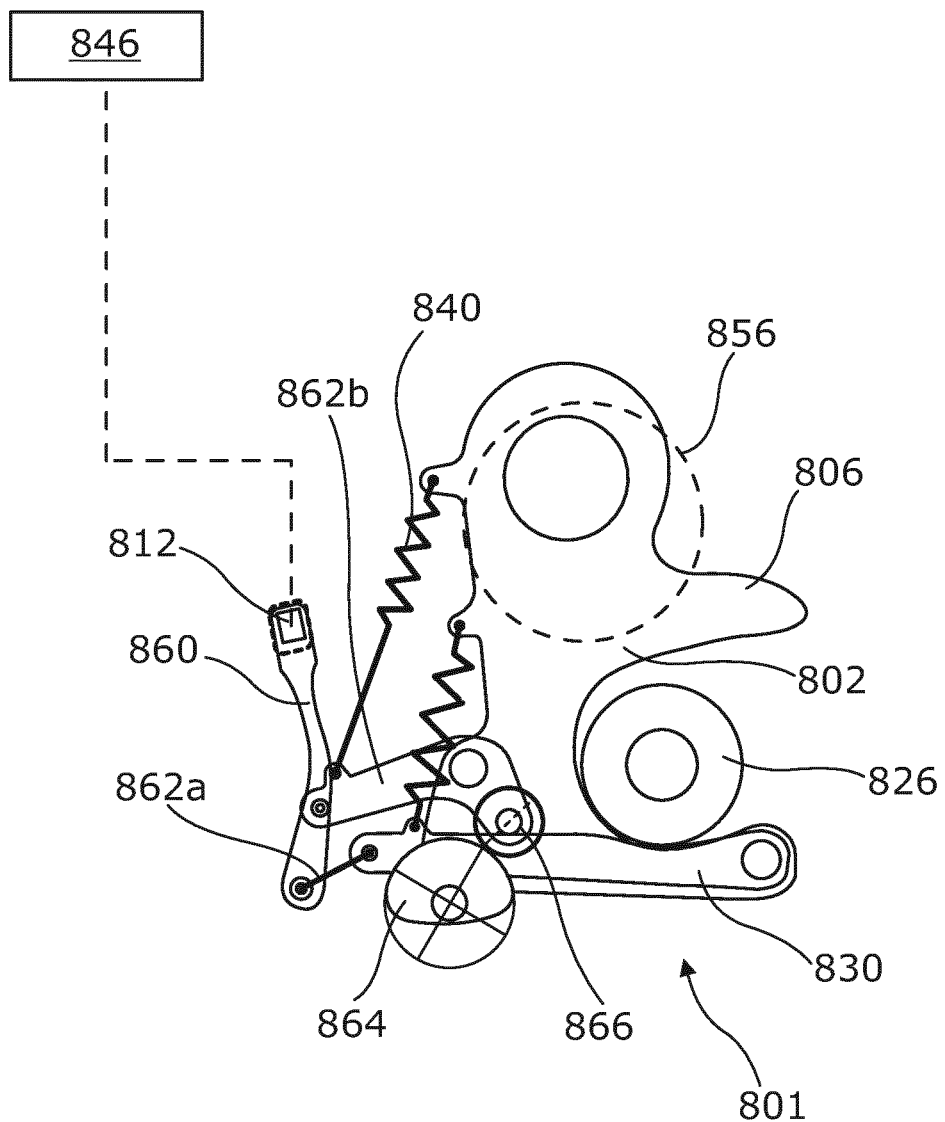
FIG. 11 shows a schematic view of part of an uplock in accordance with an eighth example embodiment in (a) the open and (b) the closed configuration.
Figure 11B:
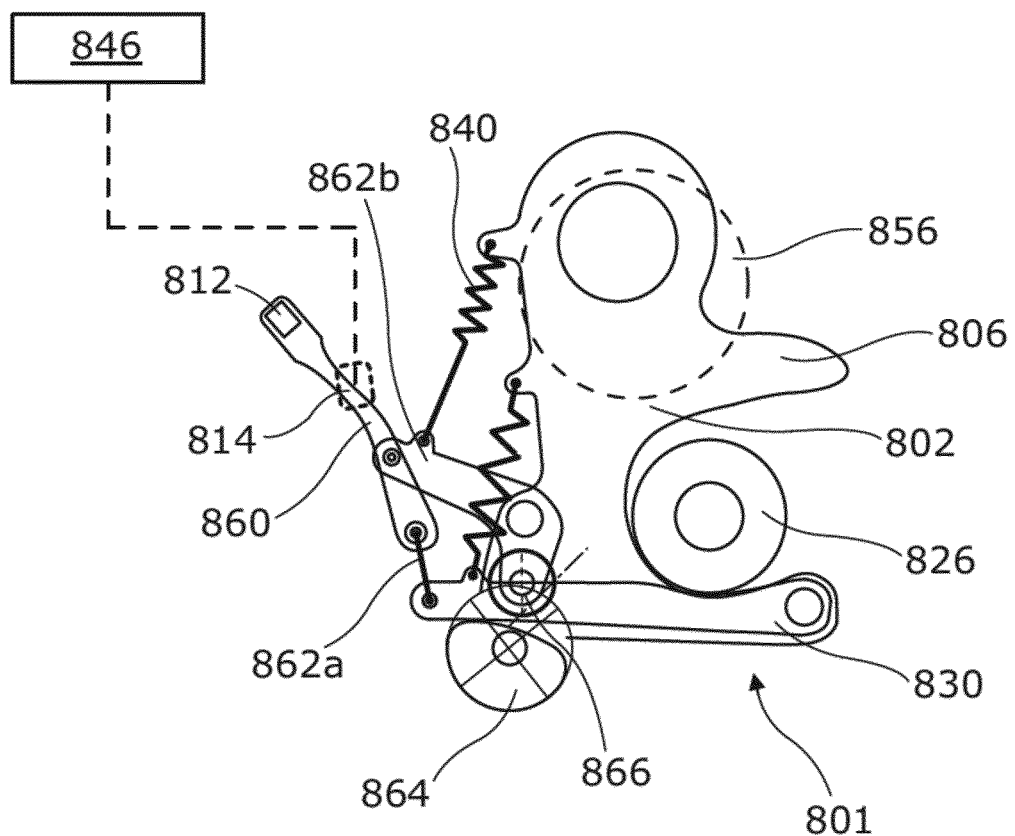

FIG. 11 shows an uplock 801 in accordance with an eighth example embodiment of the invention in (a) the closed and locked and (b) the open and unlocked configuration. Only those elements of the present embodiment which differ with respect to the seventh embodiment will be discussed here. Like reference numerals denote like elements. In the present embodiment locking piston 708 has been replaced with a cam 864 having a non-circular cross section and the second link 862b includes a roller 866 at the end of the link adjacent to the locking cam 864. In the locked configuration of FIG. 11(a) the cam 864 is rotated such that a portion of the cam is received in the locking recess 828, and the contact between the cam 864 and link 862b in combination with the presence of a pin 826 pressing on indicator bar 830 keeps the sensor 814 and target 812 aligned. In the unlocked configuration of FIG. 11(b) the cam has rotated such that no portion of the cam 864 is located in the locking recess, and without the contact with the cam 864 to prevent it doing so, the link 862b has rotated moving the sensor 814 away from the target 812. The roller 866 allows the link 862 to accommodate the movement of the cam 864. Uplocks having a rotating locking cam in accordance with the present embodiment may have reduced losses due to friction and/or reduced risk of jamming compared to uplocks having locking members with other motions.

Figure 12A:
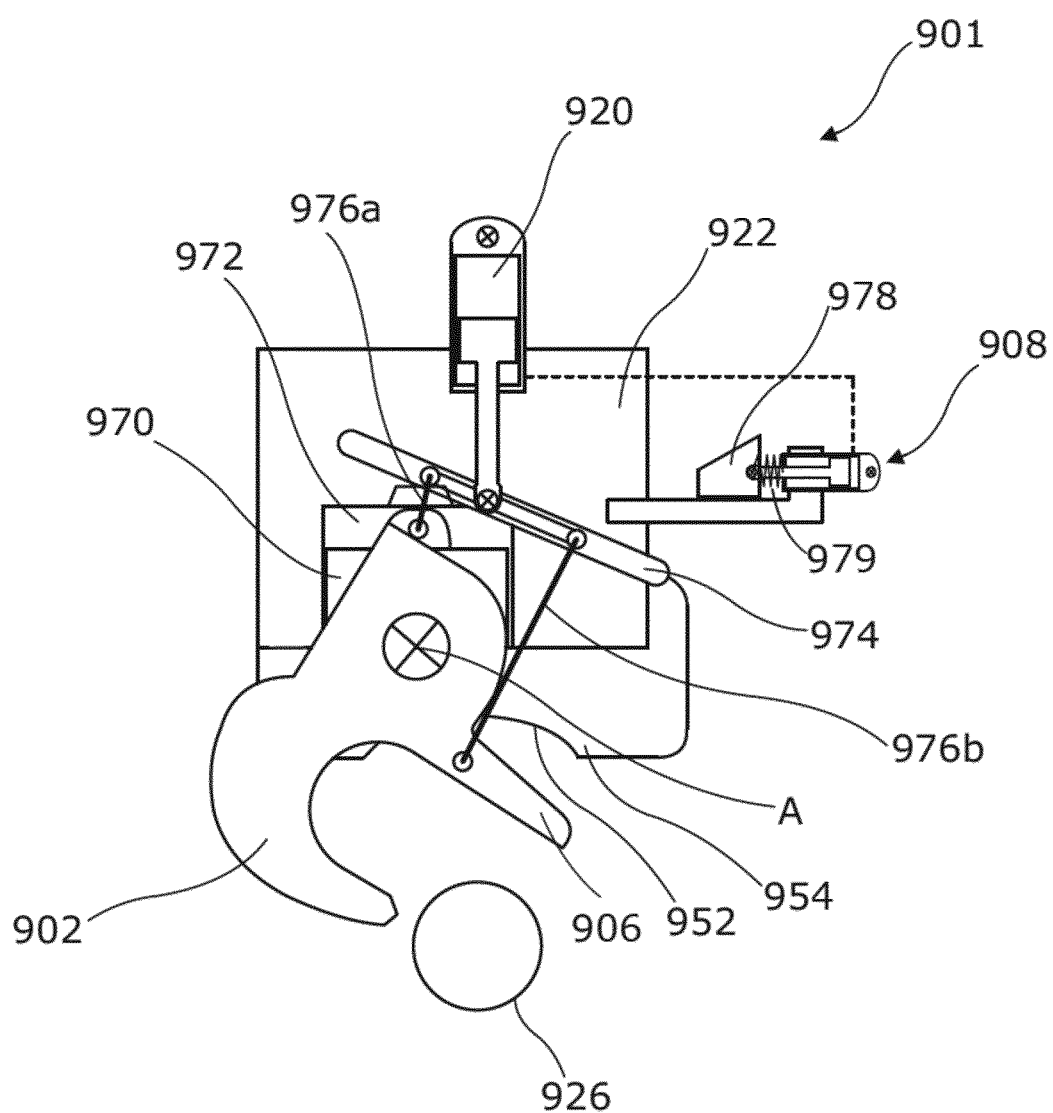
FIG. 12 shows a schematic view of part of an uplock in accordance with a ninth example embodiment in (a) the open and (b) the closed configuration.
Figure 12B:
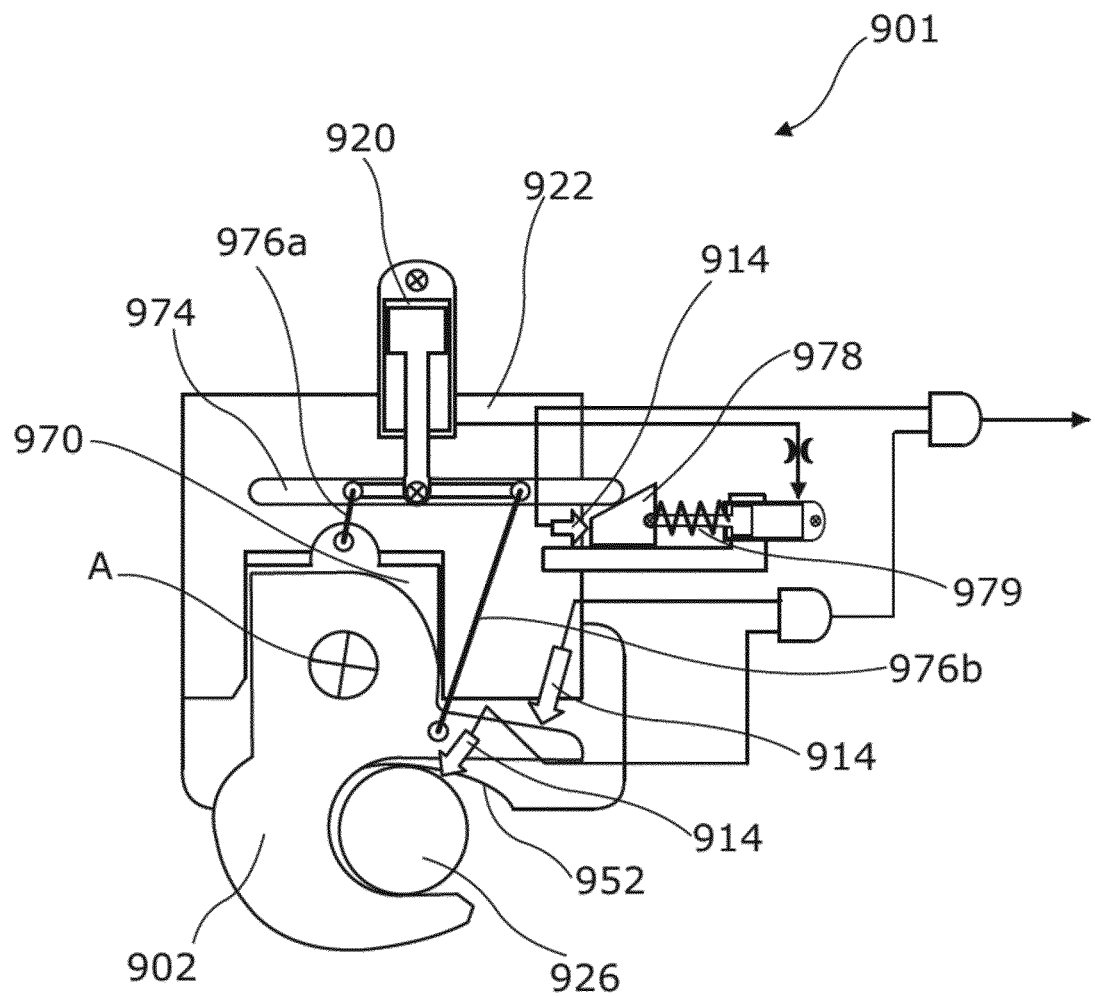

FIG. 12 shows a portion of an uplock 901 in accordance with a ninth example embodiment of the invention in (a) the open and unlocked and (b) the closed and locked configuration. Only those elements of the present embodiment which differ with respect to the sixth embodiment will be discussed here. In the present embodiment the hook 902 is mounted for rotation about a point A, which is located on a guide member 970. The guide member 970 is mounted for reciprocal movement along a channel 972 formed in the body 922 of the uplock 901. An actuator 920 is located above the hook 902 and is pivotally connected to the midpoint of a beam 974. The guide member 970 is connected to the left-hand side of beam 974 via a simple link 976a which is pivotally connected to the beam 974 and the guide member 970 at its ends. The hook 902 is connected to the right-hand side of the beam 974 via a simple link 976b which is pivotally connected to the beam 974 and the hook 902 at its ends. A hydraulic lock 908 comprising a locking wedge 978 and a spring 979 is provided adjacent the beam 974. FIG. 12 (b) shows sensors 914 (indicated by arrows in FIG. 12) at the edge of the stop recess 952, opposite the locking wedge 978 and adjacent the position occupied by the hook arm 906 when the hook 902 is in the closed position. FIG. 12 (a) shows the open configuration; the pin 926 is spaced apart from the hook 902 and the stop 954, the guide member 970 is spaced apart from the top of the channel 972, and the left-hand side of beam 974 is high than the right-hand side of the beam. The locking wedge 978 is spaced apart from the corresponding sensor 914. FIG. 12(b) shows the uplock in the locked and closed configuration; the pin 926 is compressed between the hook 902 and the stop 954, the guide member 970 is at the top of the channel 972, and the beam 974 is horizontal.

In use, when the landing gear (not shown) is being retracted the pin 926 contacts the underside of the hook arm 906 causing the hook to rotate anti-clockwise about point A. At the same time the actuator 920 retracts, raising beam 974 which (via links 976) causes the guide member 970 to move upwards in channel 972 and assists in rotating the hook 902 which brings the beam 972 horizontal. With the beam 972 horizontal, hydraulic pressure is supplied to the lock 908, the wedge 978 of which can now be driven under the right-hand end of the beam 972 to prevent the hook 902 returning to the open position. The spring 979 maintains the wedge in this position when the hydraulic pressure is released. The upward movement of guide member 970 draws more of hook 902 into the channel 972, and the portion of the hook 902 engaged in the channel prevents further rotation of the hook 902. The sensors 914 provide signals to indicate: (i) that the wedge 978 is engaged with the beam 974, (ii) that the hook 902 is in the closed position and (iii) that the pin 926 is adjacent the stop 954. If all these criteria are fulfilled, then a signal may be provided to the pilot that the uplock has properly engaged. Conversely, if only two out of the three criteria are fulfilled the pilot may be alerted that there may be an uplock fault.

Figure 13:
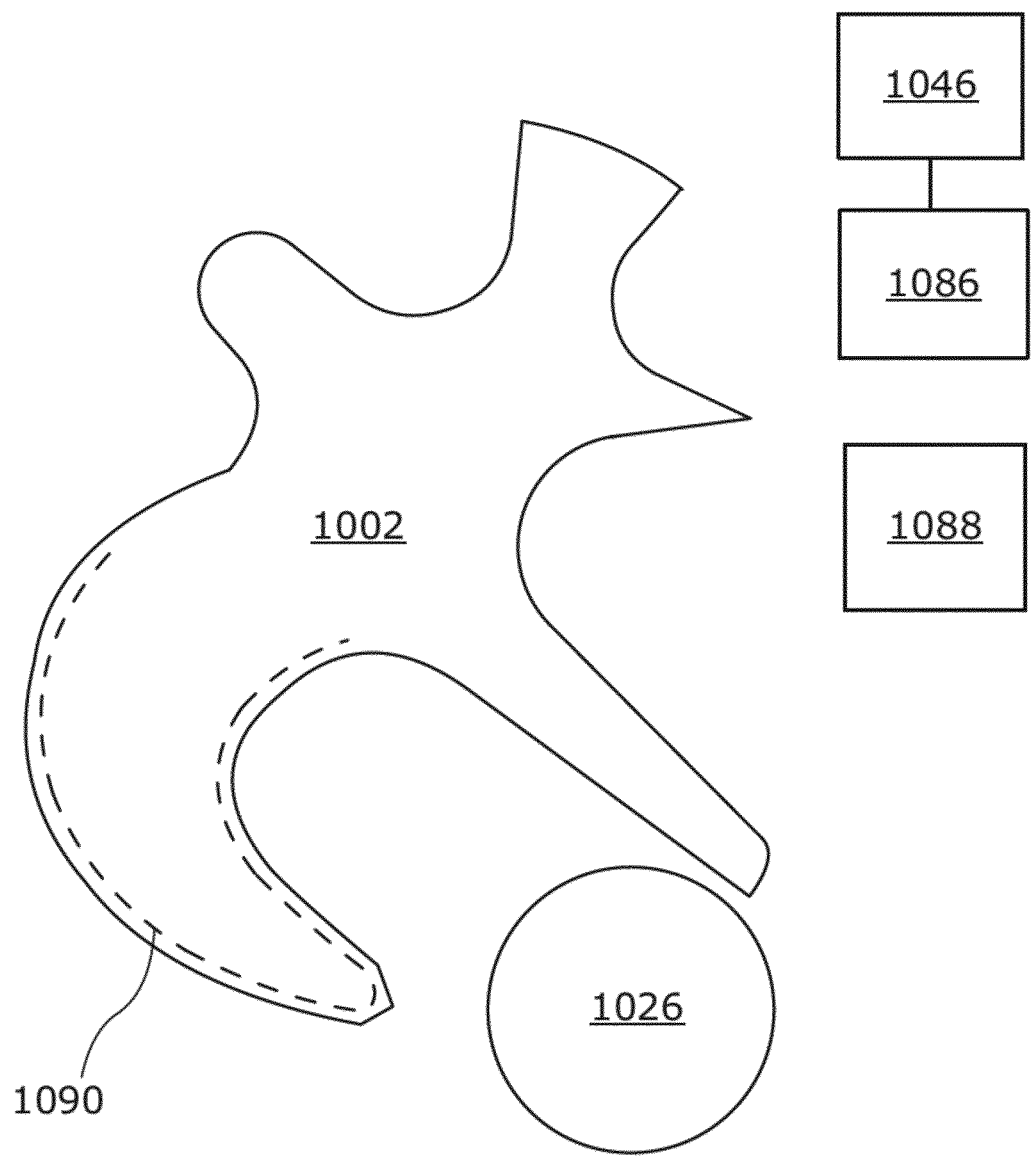
FIG. 13 shows a schematic view of a hook for use in an uplock in accordance with a tenth example embodiment.

FIG. 13 shows a cross-sectional view of a hook 1002 for use in an uplock in accordance with a tenth example embodiment. Only those elements of the present embodiment which differ with respect to the prior art uplock 1 will be discussed here. Like reference numerals denote like elements. The hook 1002 includes a sensing wire 1090 (denoted by a dashed line in FIG. 13, and shown in more detail in FIG. 14) that extends around the perimeter of the lower portion of the hook 1002 in a groove formed in the surface of the hook 1002. The sensing wire 1090 is connected to a power source 1088 and a circuit for measuring resistance 1086. The circuit for measuring resistance 1086 provides information to the avionics system 1046. For clarity the connections between the power source 1088, resistance measuring circuit 1086 and wire 1090 are not shown in FIG. 13. The resistance measuring circuit 1086 is connected to the avionics system 1046.

In use, the power source 1088 provides a current through the wire 1090 and the circuit 1086 measures the resistance of the wire 1090 and passes that information to the avionics system 1046. In normal use the sensing wire 1090 is protected from damage or contact with other elements of the uplock by virtue of being located within the groove and the resistance of the wire will remain substantially constant. In the case that the lower portion of the hook 1002 shears the sensing wire 1090 will be damaged, for example deformed, stretched or broken leading to a change in the resistance of the wire 1090. For example in the case that the wire 1090 is broken this will lead to an open circuit having very high resistance. This change in resistance of the wire 1090 is detected by the circuit 1086 which passes a signal to the avionics system corresponding to the new resistance. The change in resistance causes the avionics system 1046 to alert the pilot to the possibility of an uplock failure.

Figure 14:
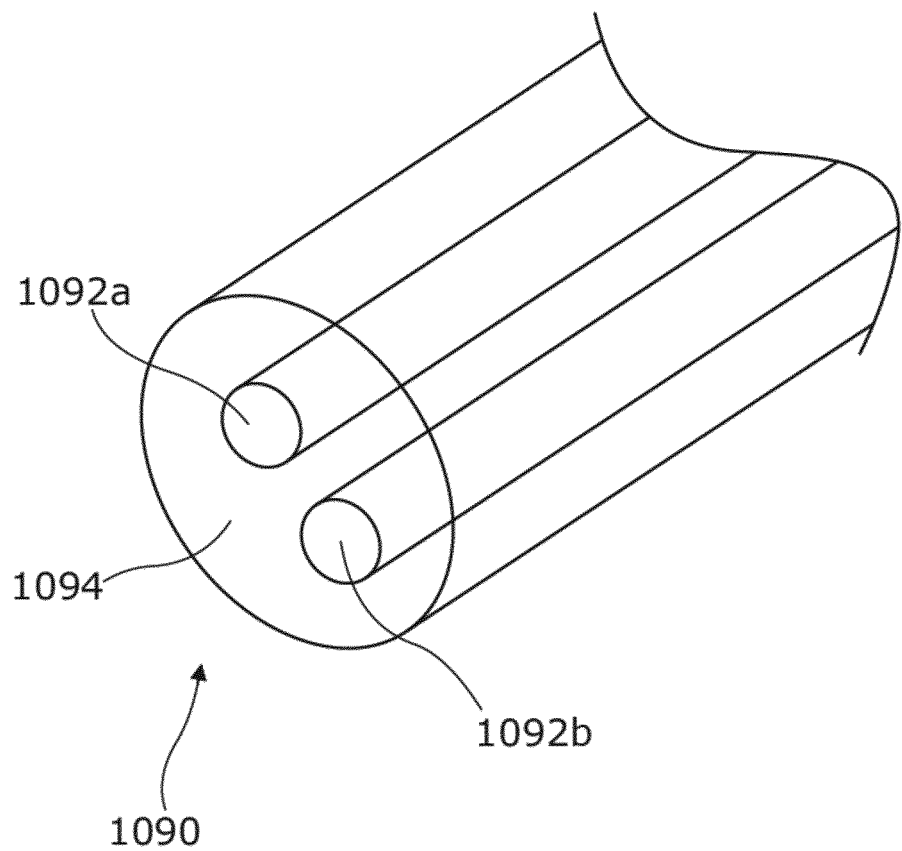
FIG. 14 shows a cross-sectional view of a sensing wire for use in the tenth embodiment.

FIG. 14 shows a cross-sectional schematic view of the sensing wire 1090 of the tenth example embodiment. The sensing wire 1090 comprises a ground wire 1092a and a detector wire 1092b connected to the circuit 1086. The two wires 1092 are separated by an insulating material 1094. In normal use the insulator prevents current flowing between the detector wire 1092b and the ground wire 1092a, and the detector wire 1092b (and the circuit of which is part) has a first voltage. If the hook 1002 breaks, and the sensing wire 1090 is sufficiently deformed the detector wire 1092b comes into contact with the ground wire 1092a, allowing current to flow from the detector wire 1092b to ground 1092a and thereby changing the resistance of the detector wire 1092b. If the damage to the wire 1092b is sufficiently severe the wire 1092b breaks, which again leads to a change in the resistance. In other embodiments a simple, single wire, sensing wire may be used.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

While certain embodiments have been described with reference to retractable landing gear, and other embodiments with reference to wing-tip devices, it would be appreciated that the uplocks of the present invention can be used with both retractable landing and wing-tip devices as well as other aircraft components.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An uplock for use with an aircraft component, comprising:
    a hook configured to engage a capture pin mounted on the aircraft component, the hook being mounted for movement between a closed position and an open position, the uplock further comprising
        an indicator system configured to detect whether the pin is engaged with the hook when the hook is in the closed position,
        wherein the indicator system comprises
            an indicator member mounted for movement relative to the hook between a first position and a second position; and
            a sensor configured to detect the position of the indicator member, the uplock being configured such that, in use, if the pin is engaged in the hook when the hook is in the closed position, the indicator member occupies the first position, and if the pin is not engaged in the hook when the hook is in the closed position, the indicator member occupies the second position.

2. An uplock according to claim 1, wherein the capture pin engaged in the hook maintains the indicator member in the first position, and the indicator member moves from the first position towards the second position in the case the hook remains in the closed position but the pin is no longer engaged in the hook.

3. An uplock according to claim 2, wherein the indicator member is biased towards the second position such that, in normal use, the indicator member remains in second position in the absence of the force provided by the pin engaged in the hook.

4. An uplock according to claim 1, further comprising a lock member mounted from movement between an unlocked position and a locked position in which the lock member engages one or more other elements of the uplock to mechanically prevent the hook from moving from the closed position.

5. An uplock according to claim 1, wherein the capture pin contacts the indicator member when the pin is engaged in the hook.

6. An aircraft comprising an uplock in accordance with claim 1.

7. An aircraft in accordance with claim 6, the aircraft comprising an avionics system configured to receive one or more signals from the sensor and to determine whether an uplock fault has occurred in dependence on the signal so received.

8. An aircraft according to claim 6, wherein the capture pin is mounted on a retractable landing gear assembly.

9. An aircraft according to claim 8, wherein said retractable landing gear assembly being mounted on a wing of the aircraft.

10. An uplock according to claim 4, wherein the sensor is a proximity sensor, and a sensor target is associated with the indicator member such that the target is in a first position adjacent to the proximity sensor when the indicator member is in the first position, and the target is in a second position spaced apart from the proximity sensor when the indicator member is in the second position.

11. An uplock according to claim 10, wherein the uplock is configured such that, in normal use, the lock member can only occupy the locked position when the hook is in the closed position and a single sensor target is associated with the lock member and the indicator member, the uplock being configured such that the sensor target is only adjacent the proximity sensor when the lock member is in the locked position and the indicator member is in the first position.

12. An uplock according to claim 10, wherein the sensor target is connected to the indicator member via a series of linking members and the sensor target is mounted on the lock member and the uplock is configured such that, in normal use, the sensor target is only adjacent the proximity sensor when the indicator member is in the first position and the lock member is in the first position.

13. An uplock according to claim 10, wherein a single sensor target is associated with the hook and the indicator member, the uplock being configured such that the sensor target is only adjacent the proximity sensor when the hook is in the closed position and the indicator member is in the first position.

14. An uplock according to claim 10, wherein the uplock comprises a sensor member upon which the sensor target is located and one or more linking members connecting the sensor member to the indicator member; the uplock being configured such that the sensor target is only adjacent the proximity sensor when the indicator member is in the first position.

15. An uplock according to claim 14, wherein the uplock comprises one or more linking members connecting the sensor member to the hook and the uplock is configured such that the sensor target is only adjacent the proximity sensor when the indicator member is in the first position and the hook is in the closed position.

16. An uplock according to claim 14, wherein the uplock comprises one or more linking members connecting the sensor member to the lock member and the uplock is configured such that the sensor target is only adjacent the proximity sensor when the indicator member is in the first position and the lock member is in the locked position.

17. An uplock according to claim 10, wherein the sensor configured to detect the position of the indicator member is a first sensor comprising a first sensor target associated with the indicator member, the uplock further comprising a second sensor configured to detect the position of the hook and/or lock member.

18. An uplock according to claim 17, wherein the second sensor is a second proximity sensor, and a sensor target is associated with the hook such that the second target is in a first position adjacent to the second proximity sensor when the hook is in the closed position, and the second target is in a second position spaced apart from the second proximity sensor when the hook is in the open position.

19. An uplock according to claim 17, wherein the second sensor is a second proximity sensor, and a sensor target is associated with the lock member such that the second target is in a first position adjacent to the second proximity sensor when the lock member is in the locked position, and the second target is in a second position spaced apart from the second proximity sensor when the lock member is in the unlocked position.

* * * * *